United States Patent
Osabe et al.

(10) Patent No.: US 10,262,781 B2
(45) Date of Patent: Apr. 16, 2019

(54) SUPERCONDUCTING WIRE AND METHOD FOR MANUFACTURING THE SAME

(71) Applicant: SUMITOMO ELECTRIC INDUSTRIES, LTD., Osaka-shi, Osaka (JP)

(72) Inventors: Goro Osabe, Osaka (JP); Kohei Yamazaki, Osaka (JP); Takeshi Kato, Osaka (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 344 days.

(21) Appl. No.: 15/306,844

(22) PCT Filed: May 23, 2016

(86) PCT No.: PCT/JP2016/065124
§ 371 (c)(1),
(2) Date: Oct. 26, 2016

(87) PCT Pub. No.: WO2017/154228
PCT Pub. Date: Sep. 14, 2017

(65) Prior Publication Data
US 2018/0204658 A1    Jul. 19, 2018

(30) Foreign Application Priority Data
Mar. 11, 2016 (JP) .................. 2016-048786

(51) Int. Cl.
*H01F 6/06* (2006.01)
*H01B 12/06* (2006.01)
(Continued)

(52) U.S. Cl.
CPC ............... *H01F 6/06* (2013.01); *H01B 12/06* (2013.01); *H01R 4/68* (2013.01); *H01R 43/00* (2013.01); *H01R 43/02* (2013.01); *Y02E 40/641* (2013.01)

(58) Field of Classification Search
CPC ................... H01F 600/06; H01B 12/00–12/06
See application file for complete search history.

(56) References Cited

U.S. PATENT DOCUMENTS

| | | | | |
|---|---|---|---|---|
| 8,173,897 | B2 * | 5/2012 | Hirose .................. | H01B 12/16 174/125.1 |
| 8,886,267 | B2 * | 11/2014 | Folts ..................... | H01B 12/02 505/230 |

(Continued)

FOREIGN PATENT DOCUMENTS

| | | |
|---|---|---|
| JP | 2007-266149 A | 10/2007 |
| JP | 2008-234957 A | 10/2008 |

(Continued)

Primary Examiner — Colleen P Dunn
(74) Attorney, Agent, or Firm — Drinker Biddle & Reath LLP

(57) ABSTRACT

Included are: a first superconducting wire rod having a first front surface, and a first back surface, and also having a first superconducting layer, and first reinforcing layers; a second superconducting wire rod having a second front surface, and a second back surface, and also having a second superconducting layer, and second reinforcing layers; and a connection member joining the first superconducting wire rod to the second superconducting wire rod. The first superconducting wire rod has a first edge portion, and the second superconducting wire rod has a second edge portion. The first front surface located at the first edge portion is joined by the connection member to the second front surface located at other than the second edge portion, and the second front (Continued)

surface located at the second edge portion is joined by the connection member to the first front surface located at other than the first edge portion.

20 Claims, 21 Drawing Sheets

(51) Int. Cl.
    *H01R 43/00*          (2006.01)
    *H01R 43/02*          (2006.01)
    *H01R 4/68*           (2006.01)

(56) References Cited

U.S. PATENT DOCUMENTS

| | | | |
|---|---|---|---|
| 8,921,276 B2 * | 12/2014 | Kasahara | C01G 45/1264 174/125.1 |
| 9,002,424 B2 * | 4/2015 | Nagasu | H01L 39/2454 505/230 |
| 9,031,625 B2 * | 5/2015 | Lin | H01B 12/02 174/125.1 |
| 9,031,626 B2 * | 5/2015 | Lin | H01B 12/02 505/230 |

FOREIGN PATENT DOCUMENTS

| | | |
|---|---|---|
| JP | 2011-165435 A | 8/2011 |
| JP | 2011-238513 A | 11/2011 |
| JP | 2014-130730 A | 7/2014 |

* cited by examiner

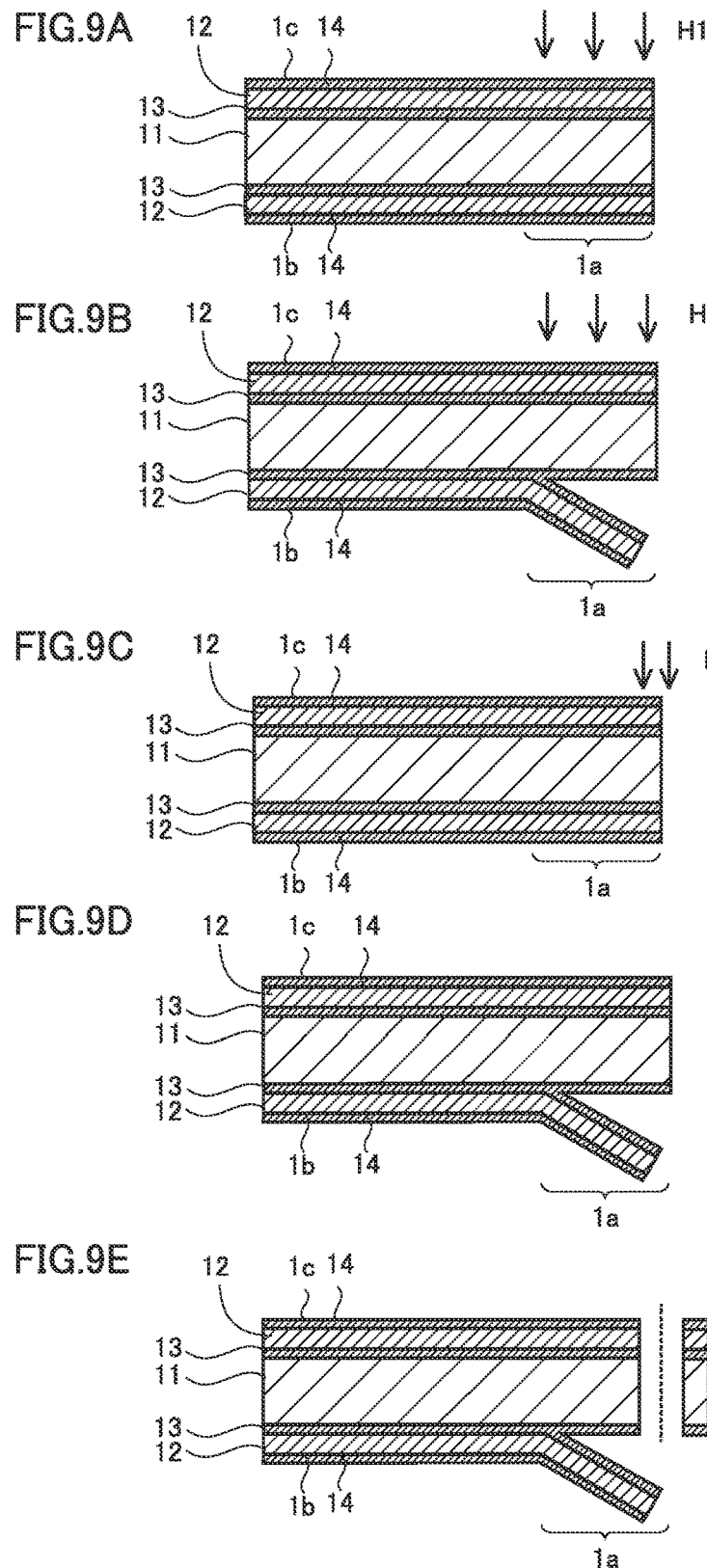

SUPERCONDUCTING WIRE AND METHOD FOR MANUFACTURING THE SAME

TECHNICAL FIELD

The present invention relates to a superconducting wire and a method for manufacturing the same.

The present application claims the priority based on Japanese Application No. 2016-48786 filed on Mar. 11, 2016, and incorporates the entire description in the Japanese application.

BACKGROUND ART

In order to fabricate a superconducting wire for a superconducting apparatus, a long superconducting wire rod is required. Generally, a long superconducting wire rod is obtained by successively connecting a plurality of superconducting wire rods.

As a structure connecting a plurality of superconducting wire rods, a connection structure described in Japanese Patent Laying-Open No. 2011-238513 (PTD 1) is proposed. A first superconducting wire rod described in PTD 1 has a superconducting layer, internal solder layers, and reinforcing layers. Further, the superconducting wire rod described in PTD 1 has an edge portion. A second superconducting wire rod described in PTD 1 has the same structure as that of the first superconducting wire rod.

The superconducting layer has a first surface and a second surface. The reinforcing layers are provided on the first surface and the second surface. However, no reinforcing layer is provided on a region of the first surface located on an edge portion side. Namely, the superconducting layer is exposed in the region of the first surface located on the edge portion side. The internal solder layers are provided between the reinforcing layers and the first and second surfaces to join the reinforcing layers to the superconducting layer.

The connection structure for superconducting wire rods described in PTD 1 has the first superconducting wire rod, a second superconducting wire rod, and a connection solder layer. The superconducting layer of the first superconducting wire rod exposed in the region of the first surface located on the edge portion side is arranged to face the superconducting layer of the second superconducting wire rod exposed in the region of the first surface located on the edge portion side. The superconducting layer of the first superconducting wire rod exposed in the region of the first surface located on the edge portion side is joined to the superconducting layer of the second superconducting wire rod exposed in the region of the first surface located on the edge portion side, by connection solder.

CITATION LIST

Patent Document

PTD 1: Japanese Patent Laying-Open No. 2011-238513

SUMMARY OF INVENTION

Solution to Problem

A superconducting wire of the present disclosure includes: a first superconducting wire rod having a first front surface, and a first back surface which is a surface opposite to the first front surface; a second superconducting wire rod having a second front surface, and a second back surface which is a surface opposite to the second front surface; and a connection member joining the first superconducting wire rod to the second superconducting wire rod. The first superconducting wire rod has a first superconducting layer, and first reinforcing layers provided on a first front surface side and a first back surface side of the first superconducting layer. The second superconducting wire rod has a second superconducting layer, and second reinforcing layers provided on a second front surface side and a second back surface side of the second superconducting layer.

The first superconducting wire rod has a first edge portion where the first reinforcing layer on the first front surface side is at least partially removed. The second superconducting wire rod has a second edge portion where the second reinforcing layer on the second front surface side is at least partially removed.

The first front surface located at the first edge portion is joined by the connection member to the second front surface located at other than the second edge portion, and the second front surface located at the second edge portion is joined by the connection member to the first front surface located at other than the first edge portion.

BRIEF DESCRIPTION OF DRAWINGS

FIG. 9A is a cross sectional view showing that a first edge portion of the first superconducting wire rod is heated in the wire rod processing step.

FIG. 9B is a cross sectional view showing that a first reinforcing layer of the first superconducting wire rod is peeled off in the wire rod processing step.

FIG. 9C is a cross sectional view showing that a first edge portion of the first superconducting wire rod is heated in a variation of the wire rod processing step.

FIG. 9D is a cross sectional view showing that a first reinforcing layer of the first superconducting wire rod is peeled off in the variation of the wire rod processing step.

FIG. 9E is a cross sectional view showing that a portion of the first edge portion of the first superconducting wire rod is cut off in the wire rod processing step.

DESCRIPTION OF EMBODIMENTS

Figure 1:
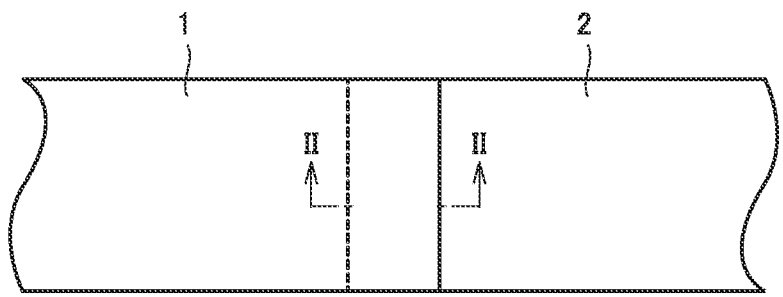
FIG. 1 is a top view of a superconducting wire in accordance with a first embodiment.

Problems to be Solved by the Present Disclosure

The joining structure for superconducting wire rods described in PTD 1 may not have sufficient mechanical properties when subjected to bending deformation, tensile deformation, and the like. Namely, when the joining structure for superconducting wire rods described in PTD 1 is subjected to bending deformation, tensile deformation, and the like, stress concentration is likely to occur at edges of a portion where the superconducting layers face each other with the connection solder being interposed therebetween.

The present disclosure has been made in view of such a problem of the conventional technique. Namely, the present disclosure provides a superconducting wire excellent in mechanical properties.

Effect of the Present Disclosure

According to the present disclosure, good mechanical properties against bending deformation, tensile deformation, and the like can be achieved.

Description of Embodiments of the Present Invention

First, embodiments of the present invention will be described in list form.

(1) A superconducting wire in accordance with one embodiment of the present invention includes: a first superconducting wire rod having a first front surface, and a first back surface which is a surface opposite to the first front surface; a second superconducting wire rod having a second front surface, and a second back surface which is a surface opposite to the second front surface; and a connection member joining the first superconducting wire rod to the second superconducting wire rod. The first superconducting wire rod has a first superconducting layer, and first reinforcing layers provided on a first front surface side and a first back surface side of the first superconducting layer. The second superconducting wire rod has a second superconducting layer, and second reinforcing layers provided on a second front surface side and a second back surface side of the second superconducting layer.

The first superconducting wire rod has a first edge portion where the first reinforcing layer on the first front surface side is at least partially removed. The second superconducting wire rod has a second edge portion where the second reinforcing layer on the second front surface side is at least partially removed.

The first front surface located at the first edge portion is joined by the connection member to the second front surface located at other than the second edge portion, and the second front surface located at the second edge portion is joined by the connection member to the first front surface located at other than the first edge portion.

With the superconducting wire in (1), good mechanical properties against bending deformation, tensile deformation, and the like can be achieved.

(2) In (1), the first reinforcing layer on the first front surface side may be entirely removed at the first edge portion, and the second reinforcing layer on the second front surface side may be entirely removed at the second edge portion.

With the superconducting wire in (2), the value of connection resistance between the first superconducting wire rod and the second superconducting wire rod can be reduced.

(3) The superconducting wire in (1) and (2) includes a conducting member having an electric resistance value lower than that of the connection member, and the conducting member is arranged between the first front surface located at the first edge portion and the second front surface located at the second edge portion.

With the superconducting wire in (3), the value of connection resistance between the first superconducting wire rod and the second superconducting wire rod can be reduced.

(4) The superconducting wire in (1) to (3) further includes a first reinforcing member provided on the first reinforcing layer on the first back surface side, and the first reinforcing member may protrude from the first edge portion, and may be joined to the second reinforcing layer on the second front surface side.

With the superconducting wire in (4), better mechanical properties against bending deformation, tensile deformation, and the like can be achieved.

(5) The superconducting wire in (1) to (4) further includes a second reinforcing member provided on the second reinforcing layer on the second back surface side, and the second reinforcing member may protrude from the second edge portion, and may be joined to the first reinforcing layer on the first front surface side.

With the superconducting wire in (5), better mechanical properties against bending deformation, tensile deformation, and the like can be achieved.

(6) The superconducting wire in (1) to (5) may have an allowable tensile strength which is more than or equal to 80% of the smaller of allowable tensile strengths of the first superconducting wire rod and the second superconducting wire rod.

With the superconducting wire in (6), a good tensile property can be achieved.

(7) The superconducting wire in (1) to (6) may have an allowable bending diameter which is less than or equal to four times the larger of allowable bending diameters of the first superconducting wire rod and the second superconducting wire rod.

With the superconducting wire in (7), a good bending property can be achieved.

(8) A superconducting wire in accordance with one embodiment of the present invention includes: a first superconducting wire rod having a first front surface, and a first back surface which is a surface opposite to the first front surface; a second superconducting wire rod having a second front surface, and a second back surface which is a surface opposite to the second front surface; and a connection member joining the first superconducting wire rod to the second superconducting wire rod. The first superconducting wire rod has a first superconducting layer, and first reinforcing layers provided on a first front surface side and a first back surface side of the first superconducting layer. The second superconducting wire rod has a second superconducting layer, and second reinforcing layers provided on a second front surface side and a second back surface side of the second superconducting layer.

The first superconducting wire rod has a first edge portion where the first reinforcing layer on the first front surface side is at least partially removed. The second superconducting wire rod has a second edge portion where the second reinforcing layer on the second front surface side is at least partially removed.

The first front surface located at the first edge portion and the second front surface located at the second edge portion are joined by the connection member. The first reinforcing layer on the first back surface side has a first protruding portion which protrudes from the first edge portion and is joined to the second reinforcing layer on the second front surface side. The second reinforcing layer on the second back surface side has a second protruding portion which protrudes from the second edge portion and is joined to the first reinforcing layer on the first front surface side.

With the superconducting wire in (8), good mechanical properties against bending deformation, tensile deformation, and the like can be achieved.

(9) In the superconducting wire in (8), the first reinforcing layer on the first front surface side may be entirely removed at the first edge portion, and the second reinforcing layer on the second front surface side may be entirely removed at the second edge portion.

With the superconducting wire in (9), the value of connection resistance between the first superconducting wire rod and the second superconducting wire rod can be reduced.

(10) A superconducting wire in accordance with one embodiment of the present invention includes: a first superconducting wire rod having a first front surface, and a first back surface which is a surface opposite to the first front surface; a second superconducting wire rod having a second front surface, and a second back surface which is a surface opposite to the second front surface; a third reinforcing member arranged between the first front surface and the second front surface; and a connection member joining the first superconducting wire rod to the third reinforcing member, and joining the second superconducting wire rod to the third reinforcing member. The first superconducting wire rod has a first superconducting layer, and first reinforcing layers provided on a first front surface side and a first back surface side of the first superconducting layer. The first superconducting wire rod has a first edge portion where the first reinforcing layer on the first front surface side is at least partially removed. The second superconducting wire rod has a second superconducting layer, and second reinforcing layers provided on a second front surface side and a second back surface side of the second superconducting layer. The second superconducting wire rod has a second edge portion where the second reinforcing layer on the second front surface side is at least partially removed.

The first front surface located at the first edge portion is arranged to face the second front surface located at other than the second edge portion, and the second front surface located at the second edge portion is arranged to face the first front surface located at other than the first edge portion. The third reinforcing member has an electric resistance value lower than that of the connection member, and a strength higher than that of the connection member.

With the superconducting wire in (10), better mechanical properties against bending deformation, tensile deformation, and the like can be achieved, and the value of connection resistance between the first superconducting wire rod and the second superconducting wire rod can be reduced.

(11) In (10), the first reinforcing layer on the first front surface side may be entirely removed at the first edge portion, and the second reinforcing layer on the second front surface side may be entirely removed at the second edge portion.

With the superconducting wire in (11), the value of connection resistance between the first superconducting wire rod and the second superconducting wire rod can be reduced.

(12) In the superconducting wire in (1) to (11), the first reinforcing layers may produce compressive strain on the first superconducting layer, and the second reinforcing layers may produce compressive strain on the second superconducting layer.

With the superconducting wire in (12), better mechanical properties against bending deformation, tensile deformation, and the like can be achieved.

(13) In the superconducting wire in (12), the compressive strain on the first superconducting layer located at the first edge portion may be smaller than the compressive strain on the first superconducting layer located at other than the first edge portion, and the compressive strain on the second superconducting layer located at the second edge portion may be smaller than the compressive strain on the second superconducting layer located at other than the second edge portion.

With the superconducting wire in (13), the value of connection resistance between the first superconducting wire rod and the second superconducting wire rod can be reduced.

(14) A method for manufacturing a superconducting wire in accordance with one embodiment of the present invention includes the step of joining a first superconducting wire rod to a second superconducting wire rod, the first superconducting wire rod having a first front surface, and a first back surface which is a surface opposite to the first front surface, the second superconducting wire rod having a second front surface, and a second back surface which is a surface opposite to the second front surface. The first superconducting wire rod has a first superconducting layer, and first reinforcing layers provided on a first front surface side and a first back surface side. The second superconducting wire rod has a second superconducting layer, and second reinforcing layers provided on a second front surface side and a second back surface side.

The first superconducting wire rod has a first edge portion where the first reinforcing layer on the first front surface side is at least partially removed. The second superconducting wire rod has a second edge portion where the second reinforcing layer on the second front surface side is at least partially removed. The first front surface located at the first edge portion is joined by a connection member to the second front surface located at other than the second edge portion. The second front surface located at the second edge portion is joined by the connection member to the first front surface located at other than the first edge portion.

With the method for manufacturing the superconducting wire in (14), connection of a superconducting wire having better mechanical properties against bending deformation, tensile deformation, and the like can be performed.

(15) In the method for manufacturing the superconducting wire in (14), the first reinforcing layer on the first front surface side located at the first edge portion and the second reinforcing layer on the second front surface side located at the second edge portion may be entirely removed.

With the method for manufacturing the superconducting wire in (15), the value of connection resistance can be reduced.

(16) The method for manufacturing the superconducting wire in (14) and (15) may further include the step of inserting a conducting member between the first front surface located at the first edge portion and the second front surface located at the second edge portion.

With the method for manufacturing the superconducting wire in (16), the value of connection resistance can be further reduced.

(17) A method for manufacturing a superconducting wire in accordance with one embodiment of the present invention includes the step of joining a first superconducting wire rod to a second superconducting wire rod, the first superconducting wire rod having a first front surface, and a first back surface which is a surface opposite to the first front surface, the second superconducting wire rod having a second front surface, and a second back surface which is a surface opposite to the second front surface. The first superconducting wire rod has a first superconducting layer, and first reinforcing layers provided on a first front surface side and a first back surface side. The second superconducting wire rod has a second superconducting layer, and second reinforcing layers provided on a second front surface side and a second back surface side.

The first superconducting wire rod has a first edge portion where the first reinforcing layer on the first front surface side is at least partially removed. The second superconducting wire rod has a second edge portion where the second reinforcing layer on the second front surface side is at least partially removed. The first front surface located at the first edge portion is joined by a connection member to the second front surface located at the second edge portion.

The first reinforcing layer on the first back surface side has a first protruding portion protruding from the first edge portion. The second reinforcing layer on the second back surface side has a second protruding portion protruding from the second edge portion. The first protruding portion is joined to the second reinforcing layer on the second front surface side. The second protruding portion is joined to the first reinforcing layer on the first front surface side.

With the method for manufacturing the superconducting wire in (17), connection of a superconducting wire having better mechanical properties against bending deformation, tensile deformation, and the like can be performed.

(18) In the method for manufacturing the superconducting wire in (17), the first reinforcing layer on the first front surface side located at the first edge portion and the second reinforcing layer on the second front surface side located at the second edge portion may be entirely removed.

With the method for manufacturing the superconducting wire in (18), the value of connection resistance can be reduced.

(19) A method for manufacturing a superconducting wire in accordance with one embodiment of the present invention includes the step of joining a first superconducting wire rod and a second superconducting wire rod to a third reinforcing member by a connection member, the first superconducting wire rod having a first front surface, and a first back surface which is a surface opposite to the first front surface, the second superconducting wire rod having a second front surface, and a second back surface which is a surface opposite to the second front surface, the third reinforcing member being arranged between the first front surface and the second front surface. The first superconducting wire rod has a first edge portion where a first reinforcing layer on a first front surface side is at least partially removed. The first superconducting wire rod has a first superconducting layer, and first reinforcing layers provided on the first front surface side and a first back surface side. The second superconducting wire rod has a second edge portion where a second reinforcing layer on a second front surface side is at least partially removed. The second superconducting wire rod has a second superconducting layer, and second reinforcing layers provided on the second front surface side and a second back surface side. The first front surface located at the first edge portion is arranged to face the second front surface located at other than the second edge portion, and the second front surface located at the second edge portion is arranged to face the first front surface located at other than the first edge portion. The third reinforcing member has an electric resistance value lower than that of the connection member, and a strength higher than that of the connection member.

With the method for manufacturing the superconducting wire in (19), connection of a superconducting wire having better mechanical properties against bending deformation, tensile deformation, and the like, and having a reduced value of connection resistance can be performed.

(20) In the method for manufacturing the superconducting wire in (19), the first reinforcing layer on the first front surface side located at the first edge portion and the second reinforcing layer on the second front surface side located at the second edge portion may be entirely removed.

With the method for manufacturing the superconducting wire in (20), the value of connection resistance can be reduced.

Details of Embodiments of the Present Invention

Next, details of the embodiments will be described.

First Embodiment

Hereinafter, a configuration of a superconducting wire in accordance with a first embodiment will be described with reference to the drawings.

FIG. 1 is a top view of the superconducting wire in accordance with the first embodiment. As shown in FIG. 1, the superconducting wire in accordance with the first embodiment has a first superconducting wire rod 1, a second superconducting wire rod 2, and a connection member 3 (see FIG. 2A). For connection member 3, for example, solder such as a tin (Sn)-lead (Pb) eutectic alloy or a tin (Sn)-indium (In) alloy is used. First superconducting wire rod 1 and second superconducting wire rod 2 each have a sheet-like shape. First superconducting wire rod 1 and second superconducting wire rod 2 are joined by connection member 3. It should be noted that, although FIG. 1 shows only first superconducting wire rod 1 and second superconducting wire rod 2, the superconducting wire in accordance with the first embodiment can also be formed by joining more superconducting wire rods.

Figure 2A:
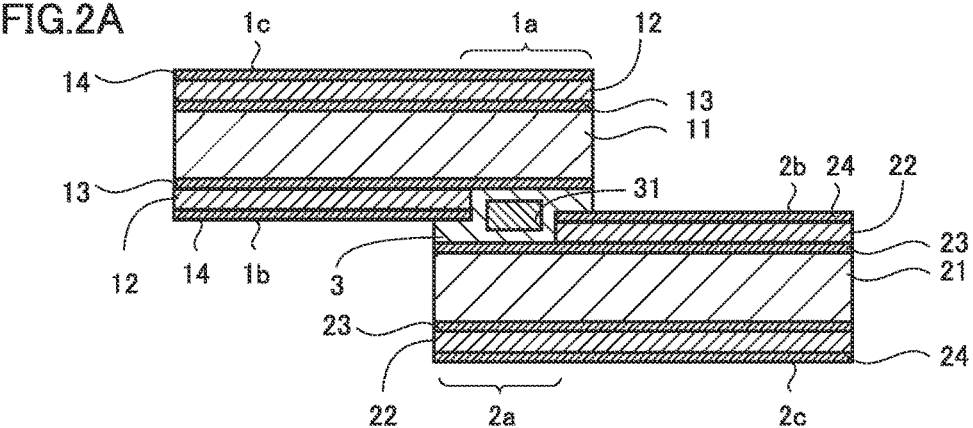
FIG. 2A is a cross sectional view at a portion where a first superconducting wire rod and a second superconducting wire rod are joined in the superconducting wire in accordance with the first embodiment.

FIG. 2A is a cross sectional view at a portion where first superconducting wire rod 1 and second superconducting wire rod 2 are joined in the superconducting wire in accordance with the first embodiment. As shown in FIG. 2A, first superconducting wire rod 1 has a first superconducting layer 11, first reinforcing layers 12, first internal connection members 13, and first surface connection members 14. Second superconducting wire rod 2 has a second superconducting layer 21, second reinforcing layers 22, second internal connection members 23, and second surface connection members 24. First superconducting wire rod 1 has a first edge portion 1a. Second superconducting wire rod 2 has a second edge portion 2a. First edge portion 1a is a portion located at an edge of first superconducting wire rod 1 in a longitudinal direction. Second edge portion 2a is a portion located at an edge of second superconducting wire rod 2 in the longitudinal direction.

First superconducting wire rod 1 has a first front surface 1b and a first back surface 1c. First back surface 1c is a surface opposite to first front surface 1b. Second superconducting wire rod 2 has a second front surface 2b and a second back surface 2c. Second back surface 2c is a surface opposite to second front surface 2b.

First superconducting layer 11 and second superconducting layer 21 are each a layer which contains a bismuth (Bi)-based high-temperature superconducting oxide in a silver (Ag) sheath, for example. However, the configuration of first superconducting layer 11 and second superconducting layer 21 is not limited thereto.

For first reinforcing layers 12 and second reinforcing layers 22, a nickel (Ni) alloy is used, for example. However, the material to be used for first reinforcing layers 12 and second reinforcing layers 22 is not limited thereto. For example, a stainless steel, a copper (Cu) alloy, or the like can be used as first reinforcing layers 12 and second reinforcing layers 22. It should be noted that the material to be used for first reinforcing layers 12 may be the same as or different from the material to be used for second reinforcing layers 22.

For first internal connection members 13 and second internal connection members 23, lead-free solder such as a tin (Sn)-silver (Ag) alloy is used, for example. First internal connection members 13 and second internal connection members 23 preferably have a melting point higher than that of connection member 3.

For first surface connection members 14 and second surface connection members 24, lead-free solder such as a tin (Sn)-silver (Ag) alloy is used, for example. It should be noted that the material for first surface connection members 14 and second surface connection members 24 may be the same as or different from the material for first internal connection members 13 and second internal connection members 23. First surface connection members 14 and second surface connection members 24 preferably have a melting point higher than that of connection member 3.

First reinforcing layers 12 are provided on a first front surface 1b side and a first back surface 1c side of first superconducting layer 11. On the first front surface 1b side located at first edge portion 1a, first reinforcing layer 12 is entirely removed.

Figure 2B:
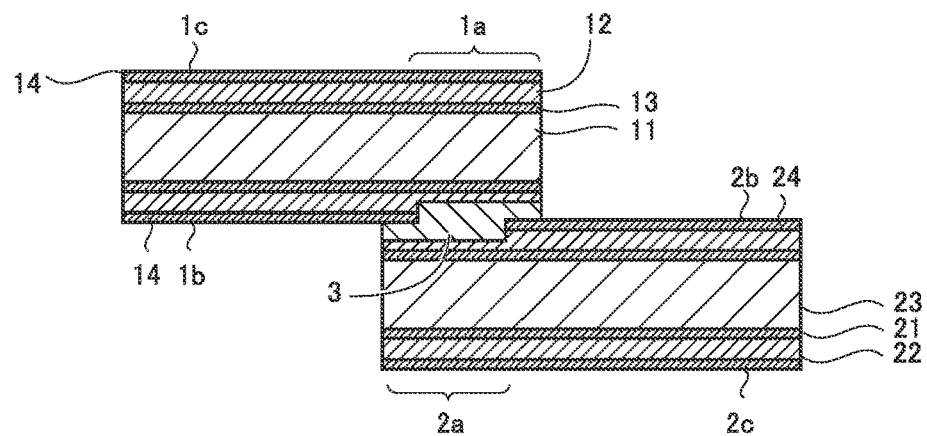
FIG. 2B is a cross sectional view at a portion where a first superconducting wire rod and a second superconducting wire rod are joined in a superconducting wire in accordance with a first variation of the first embodiment.

FIG. 2B is a cross sectional view at a portion where first superconducting wire rod 1 and second superconducting wire rod 2 are joined in a superconducting wire in accordance with a first variation of the first embodiment. It should be noted that, as shown in FIG. 2B, on the first front surface 1b side located at first edge portion 1a, first reinforcing layer 12 may be partially removed. In this case, although the first front surface 1b side of first superconducting layer 11 located at first edge portion 1a is covered with first reinforcing layer 12, the thickness of first reinforcing layer 12 on the first front surface 1b side located at first edge portion 1a is thinner than the thickness of first reinforcing layer 12 on the first front surface 1b side located at other than first edge portion 1a. Thus, first edge portion 1a only needs to be a portion where first reinforcing layer 12 on the first front surface 1b side is at least partially removed.

As shown in FIG. 2A, second reinforcing layers 22 are provided on a second front surface 2b side and a second back surface 2c side of second superconducting layer 21. On the second front surface 2b side located at second edge portion 2a, second reinforcing layer 22 is entirely removed.

It should be noted that, as shown in FIG. 2B, on the second front surface 2b side located at second edge portion 2a, second reinforcing layer 22 may be partially removed. In this case, although the second front surface 2b side of second superconducting layer 21 located at second edge portion 2a is covered with second reinforcing layer 22, the thickness of second reinforcing layer 22 on the second front surface 2b side located at second edge portion 2a is thinner than the thickness of second reinforcing layer 22 on the second front surface 2b side located at other than second edge portion 2a. Thus, second edge portion 2a only needs to be a portion where second reinforcing layer 22 on the second front surface 2b side is at least partially removed.

First reinforcing layers 12 are provided on first superconducting layer 11 with tension being applied thereto. Thereby, first reinforcing layers 12 produce compressive strain on first superconducting layer 11. The compressive strain produced in first superconducting layer 11 located at first edge portion 1a may be smaller than the compressive strain produced in first superconducting layer 11 located at other than first edge portion 1a. When compressive strain produced on the first front surface 1b side of first superconducting layer 11 located at first edge portion 1a is smaller than compressive strain produced on the first back surface 1c side of first superconducting layer 11 located at first edge portion 1a, first edge portion 1a preferably has a narrow width in the longitudinal direction. Specifically, in this case, the width of first edge portion 1a in the longitudinal direction is preferably less than or equal to 20 mm.

Second reinforcing layers 22 are provided on second superconducting layer 21 with tension being applied thereto. Thereby, second reinforcing layers 22 produce compressive strain on second superconducting layer 21. The compressive strain produced in second superconducting layer 21 located at second edge portion 2a may be smaller than the compressive strain produced in second superconducting layer 21 located at other than second edge portion 2a. When compressive strain produced on the second front surface 2b side of second superconducting layer 21 located at second edge portion 2a is smaller than compressive strain produced on the second back surface 2c side of second superconducting layer 21 located at second edge portion 2a, second edge portion 2a preferably has a narrow width in the longitudinal direction. Specifically, in this case, the width of second edge portion 2a in the longitudinal direction is preferably less than or equal to 20 mm.

It should be noted that the compressive strain is measured by an X-ray or neutron diffraction method. Further, the compressive strain may be measured using a springboard.

Each first internal connection member 13 is provided between first superconducting layer 11 and each first reinforcing layer 12. Thereby, first superconducting layer 11 and first reinforcing layers 12 are joined. Each second internal connection member 23 is provided between second superconducting layer 21 and each second reinforcing layer 22. Thereby, second superconducting layer 21 and second reinforcing layers 22 are joined. It should be noted that, when first reinforcing layer 12 on the first front surface 1b side located at first edge portion 1a is entirely removed, first internal connection member 13 on the first front surface 1b side located at first edge portion 1a may be removed. Further, when second reinforcing layer 22 on the second front surface 2b side located at second edge portion 2a is entirely removed, second internal connection member 23 on the second front surface 2b side located at second edge portion 2a may be removed.

First surface connection members 14 are provided on first reinforcing layers 12 on the first front surface 1b side and the first back surface 1c side. Second surface connection members 24 are provided on second reinforcing layers 22 on the second front surface 2b side and the second back surface 2c side.

First front surface 1b located at first edge portion 1a is joined to second front surface 2b located at other than second edge portion 2a. Specifically, first internal connection member 13 on the first front surface 1b side located at first edge portion 1a is joined to second surface connection member 24 on the second front surface 2b side located at other than second edge portion 2a.

Second front surface 2b located at second edge portion 2a is joined to first front surface 1b located at other than first edge portion 1a. Specifically, second internal connection member 23 on the second front surface 2b side located at second edge portion 2a is joined to first surface connection member 14 on the first front surface 1b side located at other than first edge portion 1a.

It should be noted that, when first reinforcing layer 12 is provided on the first front surface 1b side located at first edge portion 1a and second reinforcing layer 22 is provided on the second front surface 2b side located at second edge portion 2a as shown in FIG. 2B, first reinforcing layer 12 on the first front surface 1b side located at first edge portion 1a is joined to second surface connection member 24 on the second front surface 2b side located at other than second edge portion 2a, and second reinforcing layer 22 on the second front surface 2b side located at second edge portion 2a is joined to first surface connection member 14 on the first front surface 1b side located at other than first edge portion 1a.

As shown in FIG. 2A, a space is provided between an edge of first reinforcing layer 12 on the first front surface 1b side and an edge of the second reinforcing layer on the second front surface 2b side. At a position provided with this space, first internal connection member 13 on the first front surface 1b side located at first edge portion 1a is joined to second internal connection member 23 on the second front surface 2b side located at second edge portion 2a.

It should be noted that, when first reinforcing layer 12 is provided on the first front surface 1b side located at first edge portion 1a and second reinforcing layer 22 is provided on the second front surface 2b side located at second edge portion 2a as shown in FIG. 2B, first reinforcing layer 12 on the first front surface 1b side located at first edge portion 1a is joined, by connection member 3, to second reinforcing layer 22 on the second front surface 2b side located at second edge portion 2a.

Between first front surface 1b located at first edge portion 1a and second front surface 2b located at second edge portion 2a, a conducting member 31 may be provided in connection member 3. For conducting member 31, a material having an electric conductivity higher than that of connection member 3 is used. For example, when connection member 3 is solder such as a Sn alloy, Cu, Ag, gold (Au), or the like is used for conducting member 31.

Figure 2C:
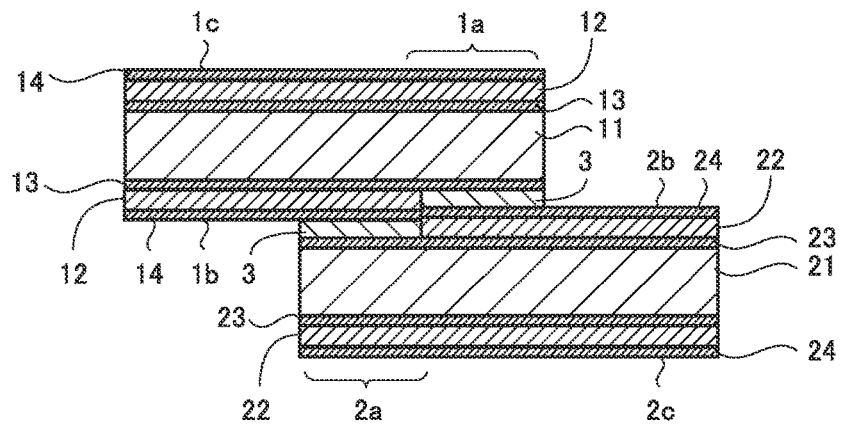
FIG. 2C is a cross sectional view at a portion where a first superconducting wire rod and a second superconducting wire rod are joined in a superconducting wire in accordance with a second variation of the first embodiment.

FIG. 2C is a cross sectional view at a portion where first superconducting wire rod 1 and second superconducting wire rod 2 are joined in a superconducting wire in accordance with a second variation of the first embodiment. As shown in FIG. 2C, no space may be provided between an edge of first reinforcing layer 12 on the first front surface 1b side and an edge of the second reinforcing layer on the second front surface 2b side. Namely, the edge of first reinforcing layer 12 on the first front surface 1b side and the edge of the second reinforcing layer on the second front surface 2b side may be in contact with each other. It should be noted that, when first reinforcing layer 12 is provided on the first front surface 1b side located at first edge portion 1a and second reinforcing layer 22 is provided on the second front surface 2b side located at second edge portion 2a, an edge of first reinforcing layer 12 on the first front surface 1b side located at other than first edge portion 1a may be in contact with an edge of second reinforcing layer 22 on the second front surface 2b side located at other than second edge portion 2a.

Figure 3:
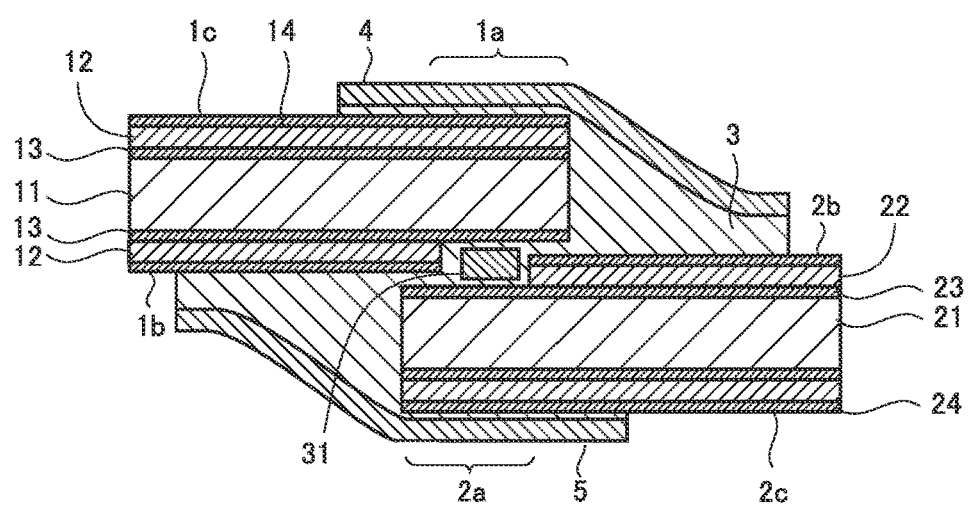
FIG. 3 is a cross sectional view of a superconducting wire in accordance with a third variation of the first embodiment.

FIG. 3 is a cross sectional view of a third variation of the superconducting wire in accordance with the first embodiment. As shown in FIG. 3, the superconducting wire in accordance with the first embodiment may have a first reinforcing member 4 and a second reinforcing member 5. It should be noted that the superconducting wire in accordance with the first embodiment may have only one of first reinforcing member 4 and second reinforcing member 5.

First reinforcing member 4 is provided on first back surface 1c of first superconducting wire rod 1. An edge of first reinforcing member 4 protrudes from first edge portion 1a and is joined to second front surface 2b of second superconducting wire rod 2 by connection member 3. Second reinforcing member 5 is provided on second back surface 2c of second superconducting wire rod 2. An edge of second reinforcing member 5 protrudes from second edge portion 2a and is joined to first front surface 1b of first superconducting wire rod 1 by connection member 3. The material to be used for first reinforcing member 4 and second reinforcing member 5 may be different from or the same as the material to be used for first reinforcing layers 12 and second reinforcing layers 22.

Figure 4:
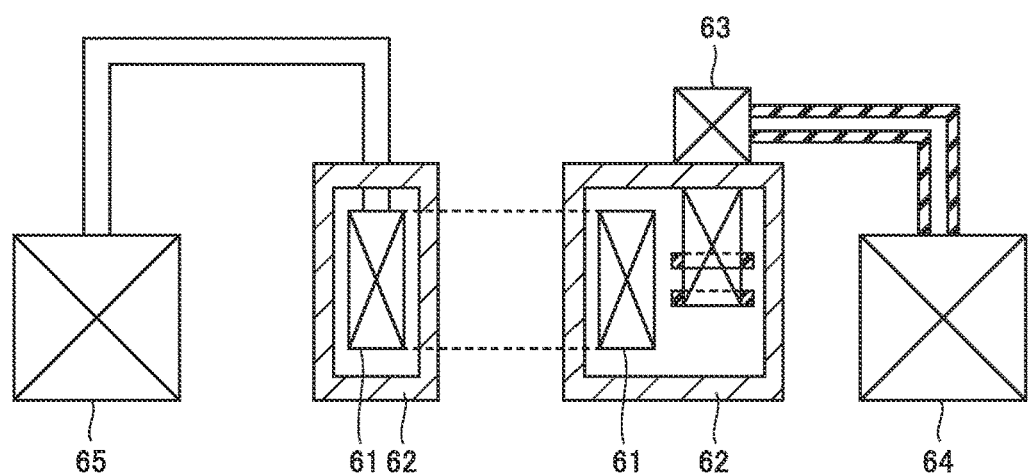
FIG. 4 is a schematic view of a superconducting apparatus using the superconducting wire in accordance with the first embodiment.

A structure of a superconducting apparatus using the superconducting wire in accordance with the first embodiment will be described below. FIG. 4 is a schematic view of a superconducting apparatus 6 using the superconducting wire in accordance with the first embodiment. Superconducting apparatus 6 using the superconducting wire in accordance with the first embodiment is, for example, a freezer cooling-type superconducting magnet system. It should be noted that the apparatus using the superconducting wire in accordance with the first embodiment is not limited thereto.

Superconducting apparatus 6 using the superconducting wire in accordance with the first embodiment has a superconducting coil body 61, for example. For superconducting coil body 61, the superconducting wire in accordance with the first embodiment is used. Superconducting apparatus 6 using the superconducting wire in accordance with the first embodiment also has a heat insulating container 62 for storing superconducting coil body 61, a freezer 63 for cooling superconducting coil body 61, a compressor 64 for driving freezer 63, and a power source 65, for example, as other components.

A method for manufacturing the superconducting wire in accordance with the first embodiment will be described below.

Figure 5:
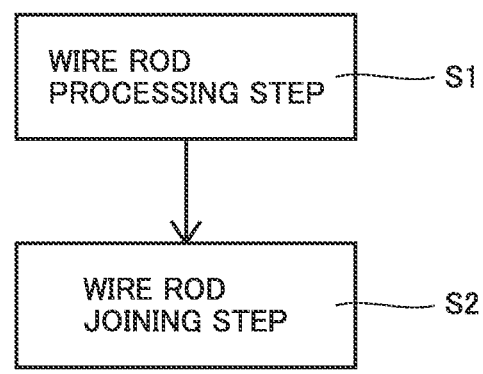
FIG. 5 is a process chart of a method for manufacturing the superconducting wire in accordance with the first embodiment.

FIG. 5 is a process chart of the method for manufacturing the superconducting wire in accordance with the first embodiment. As shown in FIG. 5, the method for manufacturing the superconducting wire in accordance with the first embodiment has a wire rod processing step S1 and a wire rod joining step S2.

Figure 6A:
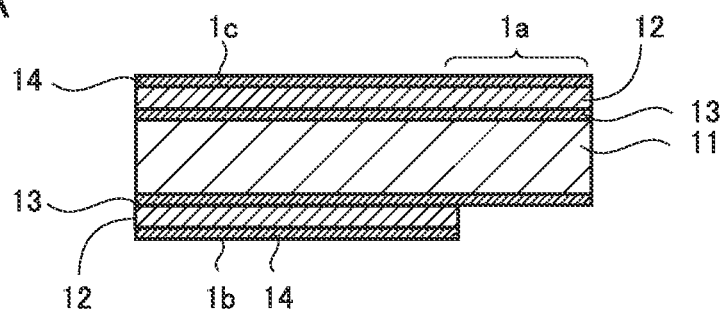
FIG. 6A is a cross sectional view of a first superconducting wire rod subjected to a wire rod processing step.
Figure 6B:
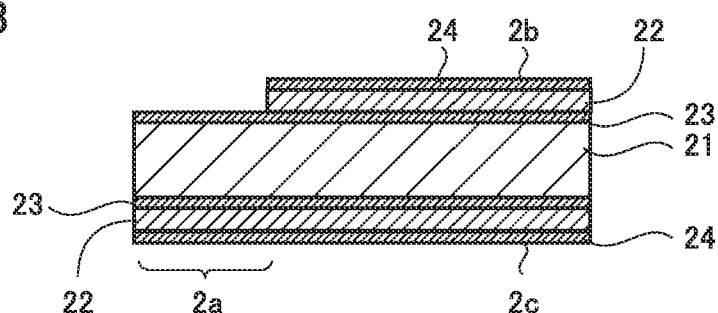
FIG. 6B is a cross sectional view of a second superconducting wire rod subjected to the wire rod processing step.
Figure 6C:
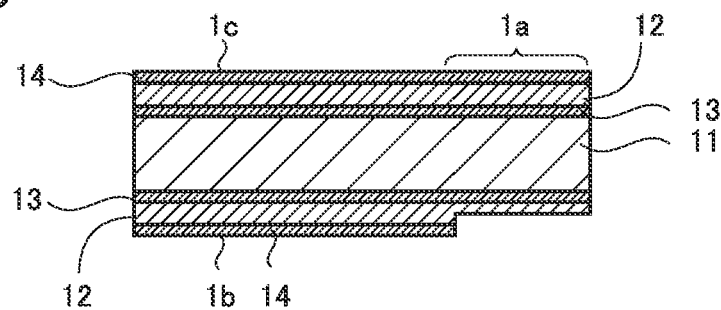
FIG. 6C is a cross sectional view of a variation of the first superconducting wire rod subjected to the wire rod processing step.
Figure 6D:
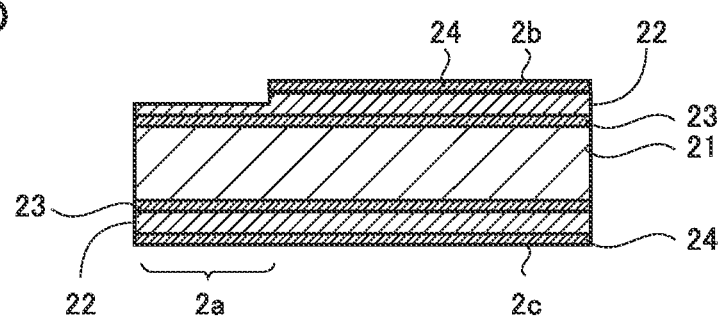
FIG. 6D is a cross sectional view of a variation of the second superconducting wire rod subjected to the wire rod processing step.

FIG. 6A is a cross sectional view of first superconducting wire rod 1 subjected to wire rod processing step S1. FIG. 6B is a cross sectional view of second superconducting wire rod 2 subjected to wire rod processing step S1. As shown in FIGS. 6A and 6B, first reinforcing layer 12 on the first front surface 1b side located at first edge portion 1a and second reinforcing layer 22 on the second front surface 2b side located at second edge portion 2a are entirely removed by wire rod processing step S1. FIG. 6C is a cross sectional view of a variation of first superconducting wire rod 1 subjected to wire rod processing step S1. FIG. 6D is a cross sectional view of a variation of second superconducting wire rod 2 subjected to wire rod processing step S1. As shown in FIGS. 6C and 6D, first reinforcing layer 12 on the first front surface 1b side located at first edge portion 1a and second reinforcing layer 22 on the second front surface 2b side located at second edge portion 2a may be partially removed by wire rod processing step S1.

Figure 7A:
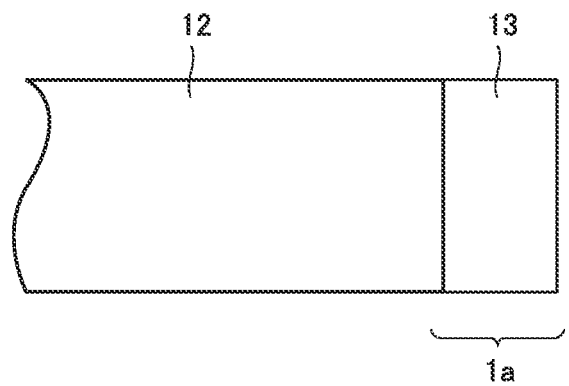
FIG. 7A is a top view of the first superconducting wire rod subjected to the wire rod processing step, seen from a first front surface side.
Figure 7B:
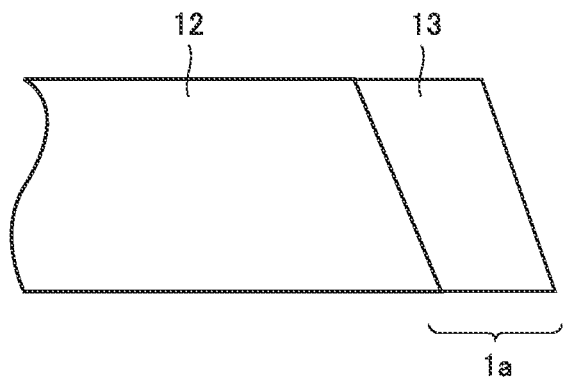
FIG. 7B is a top view of a variation of the first superconducting wire rod subjected to the wire rod processing step, seen from the first front surface side.
Figure 7C:
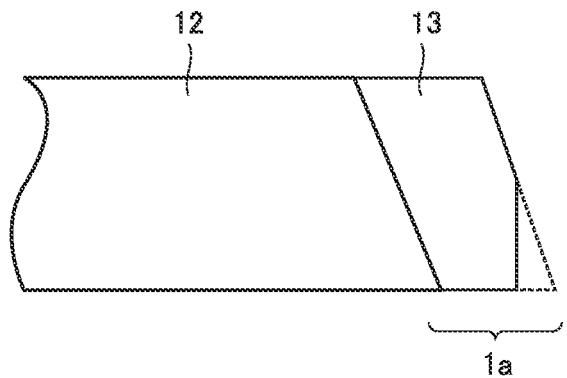
FIG. 7C is a top view of another variation of the first superconducting wire rod subjected to the wire rod processing step, seen from the first front surface side.

FIG. 7A is a top view of first superconducting wire rod 1 subjected to wire rod processing step S1, seen from the first front surface 1b side. As shown in FIG. 7A, first reinforcing layer 12 on the first front surface 1b side located at first edge portion 1a may be removed such that an edge of first reinforcing layer 12 makes a right angle with the longitudinal direction of first superconducting wire rod 1. FIG. 7B is a top view of a variation of first superconducting wire rod 1 subjected to wire rod processing step S1, seen from the first front surface 1b side. It should be noted that, as shown in FIG. 7B, first reinforcing layer 12 on the first front surface 1b side located at first edge portion 1a may be removed such that an edge of first reinforcing layer 12 is inclined with respect to the longitudinal direction of first superconducting wire rod 1, and an edge of first superconducting wire rod 1 may be removed to be inclined with respect to the longitudinal direction of first superconducting wire rod 1. FIG. 7C is a top view of another variation of first superconducting wire rod 1 subjected to wire rod processing step S1, seen from the first front surface 1b side. As shown in FIG. 7C, when the edge of first superconducting wire rod 1 is removed to be inclined with respect to the longitudinal direction of first superconducting wire rod 1, a tip portion thereof may be further removed.

Figure 8A:
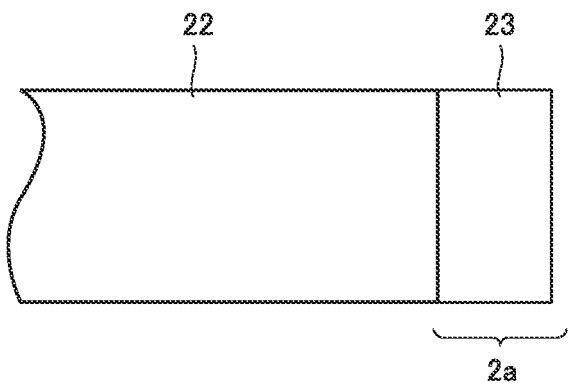
FIG. 8A is a top view of the second superconducting wire rod subjected to the wire rod processing step, seen from a second front surface side.
Figure 8B:
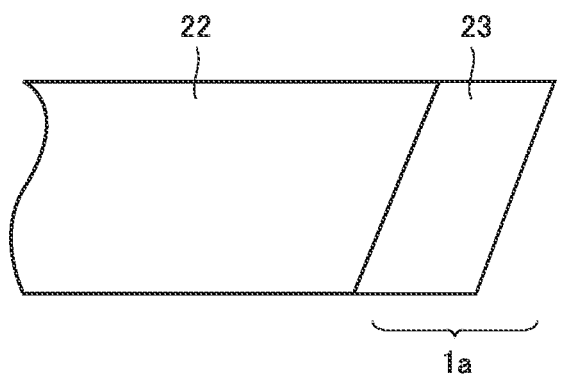
FIG. 8B is a top view of a variation of the second superconducting wire rod subjected to the wire rod processing step, seen from the second front surface side.
Figure 8C:
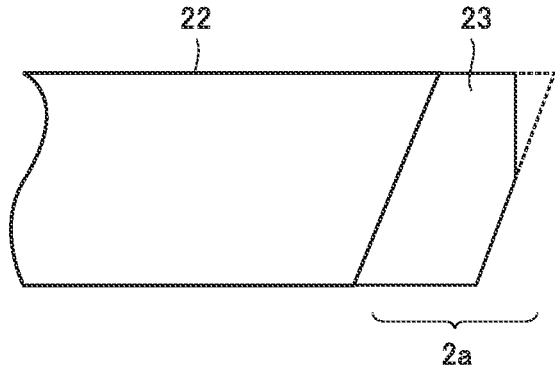
FIG. 8C is a top view of another variation of the second superconducting wire rod subjected to the wire rod processing step, seen from the second front surface side.

FIG. 8A is a top view of second superconducting wire rod 2 subjected to wire rod processing step S1, seen from the second front surface 2b side. As shown in FIG. 8A, second reinforcing layer 22 on the second front surface 2b side located at second edge portion 2a may be removed such that an edge of second reinforcing layer 22 makes a right angle with the longitudinal direction of second superconducting wire rod 2. FIG. 8B is a top view of a variation of second superconducting wire rod 2 subjected to wire rod processing step S1, seen from the second front surface 2b side. It should be noted that, as shown in FIG. 8B, second reinforcing layer 22 on the second front surface 2b side located at second edge portion 2a may be removed such that an edge of second reinforcing layer 22 is inclined with respect to the longitudinal direction of second superconducting wire rod 2, and an edge of second superconducting wire rod 2 may be removed to be inclined with respect to the longitudinal direction of second superconducting wire rod 2. In this case, the edge of second reinforcing layer 22 and the edge of second superconducting wire rod 2 are preferably removed to be parallel to the edge of first reinforcing layer 12 and the edge of first superconducting wire rod 1 when first front surface 1b and second front surface 2b overlap to face each other. FIG. 8C is a top view of another variation of second superconducting wire rod 2 subjected to wire rod processing step S1, seen from the second front surface 2b side. It should be noted that, as shown in FIG. 8C, when the edge of second superconducting wire rod 2 is removed to be inclined with respect to the longitudinal direction of second superconducting wire rod 2, a tip portion thereof may be further removed. With such a shape, stress concentration which occurs between first superconducting wire rod 1 and second superconducting wire rod 2 can be further relaxed.

FIG. 9A is a cross sectional view showing that first edge portion 1a of first superconducting wire rod 1 is heated in wire rod processing step S1. As shown in FIG. 9A, in wire rod processing step S1, first, heat H1 is applied to first edge portion 1a of first superconducting wire rod 1. Thereby, first internal connection members 13 located at first edge portion 1a are melted. It should be noted that, since first internal connection members 13 located at first edge portion 1a are melted, the compressive strain applied by first reinforcing layers 12 to first superconducting layer 11 located at first edge portion 1a is released.

FIG. 9B is a cross sectional view showing that first reinforcing layer 12 of first superconducting wire rod 1 is peeled off in wire rod processing step S1. Next, as shown in FIG. 9B, first reinforcing layer 12 on the first front surface 1b side is peeled off. Peeling-off of first reinforcing layer 12 on the first front surface 1b side is performed with first internal connection members 13 located at first edge portion 1a being melted (that is, with heat H1 being applied). A peeled-off portion of first reinforcing layer 12 on the first front surface 1b side is removed by cutting or the like.

FIG. 9C is a cross sectional view showing that first edge portion 1a of first superconducting wire rod 1 is heated in a variation of wire rod processing step S1. FIG. 9D is a cross sectional view showing that first reinforcing layer 12 of first superconducting wire rod 1 is peeled off in the variation of wire rod processing step S1. As shown in FIGS. 9C and 9D, heat H2 may be applied to only an edge of first superconducting wire rod 1 on the first edge portion 1a side, and then first reinforcing layer 12 on the first front surface 1b side may be peeled off. In this case, only first internal connection members 13 located at the edge on the first edge portion 1a side are melted by heat H2. That is, most of first internal connection members 13 located at first edge portion 1a is not melted. Therefore, the compressive strain applied by first reinforcing layers 12 to first superconducting layer 11 located at first edge portion 1a is not released. FIG. 9E is a cross sectional view showing that a portion of first edge portion 1a of first superconducting wire rod 1 is cut off in wire rod processing step S1. It should be noted that, as shown in FIG. 9E, a portion of first edge portion 1a containing first internal connection members 13 melted by heat H2 may be removed by cutting.

It should be noted that, when first reinforcing layer 12 on the first front surface 1b side located at first edge portion 1a and second reinforcing layer 22 on the second front surface 2b side located at second edge portion 2a are partially removed, polishing is performed on first reinforcing layer 12 on the first front surface 1b side located at first edge portion 1a and second reinforcing layer 22 on the second front surface 2b side located at second edge portion 2a.

The same processing as that for first superconducting wire rod 1 is also performed on second superconducting wire rod 2, and thereby second reinforcing layer 22 on the second front surface 2b side located at second edge portion 2a is entirely or partially removed.

Figure 10A:
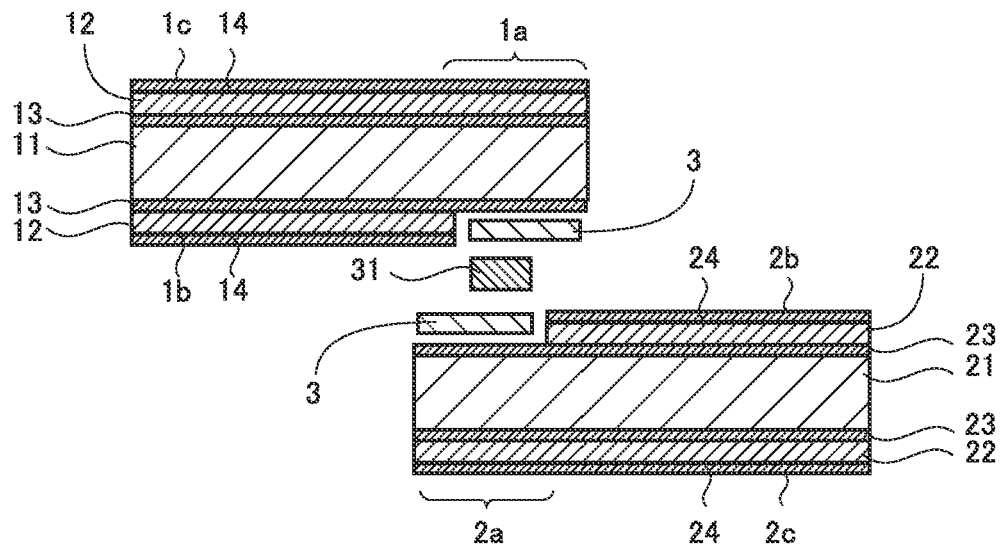
FIG. 10A is a cross sectional view of the superconducting wire in accordance with the first embodiment before joining in a wire rod joining step.

FIG. 10A is a cross sectional view of the superconducting wire in accordance with the first embodiment before joining in wire rod joining step S2. As shown in FIG. 10A, in wire rod joining step S2, first, first superconducting wire rod 1 and second superconducting wire rod 2 are arranged such that first front surface 1b located at first edge portion 1a faces second front surface 2b located at other than second edge portion 2a, and second front surface 2b located at second edge portion 2a faces first front surface 1b located at other than first edge portion 1a.

Figure 11A:
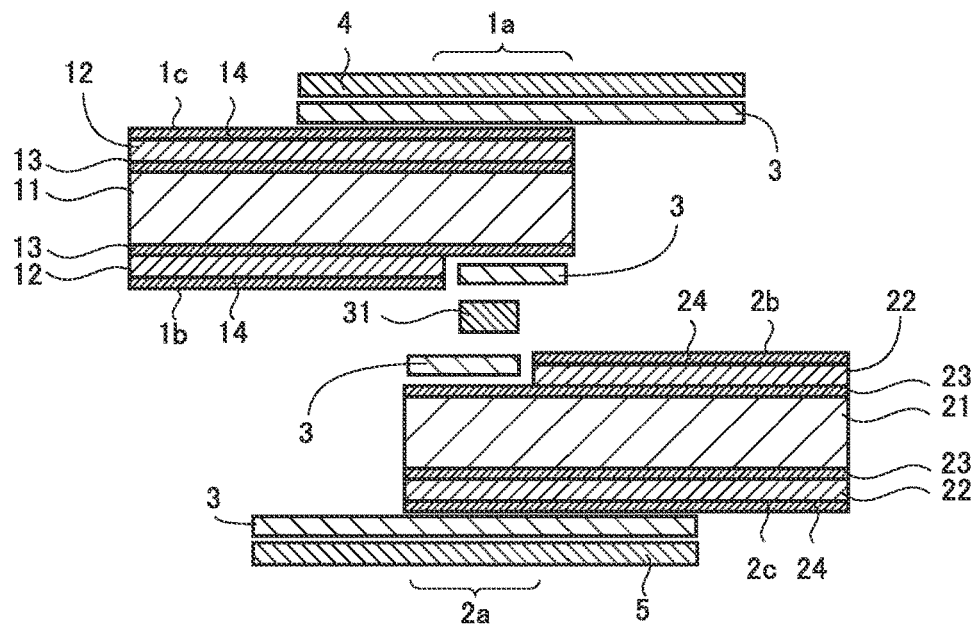
FIG. 11A is a cross sectional view of the superconducting wire in accordance with the third variation of the first embodiment before joining in the wire rod joining step.

FIG. 11A is a cross sectional view of the superconducting wire in accordance with the third variation of the first embodiment before joining in wire rod joining step S2. As shown in FIG. 11A, when first reinforcing member 4 is provided, first reinforcing member 4 is further arranged on the first back surface 1c side and the second front surface 2b side. When second reinforcing member 5 is provided, second reinforcing member 5 is further arranged on the second back surface 2c side and the first front surface 1b side.

On this occasion, as shown in FIG. 11A, connection member 3 is supplied between first front surface 1b located at first edge portion 1a and second front surface 2b located at other than the second edge portion, between first front surface 1b located at first edge portion 1a and second front surface 2b located at second edge portion 2a, and between first front surface 1b located at other than the first edge portion and second front surface 2b located at second edge portion 2a. Between first front surface 1b located at first edge portion 1a and second front surface 2b located at second edge portion 2a, conducting member 31 may be inserted into connection member 3. It should be noted that connection member 3 is supplied in the form of a paste, a sheet, or the like, for example. Further, prior to joining, flux may be applied to first front surface 1b of first superconducting wire rod 1, second front surface 2b of second superconducting wire rod 2, surfaces of connection member 3, and surfaces of conducting member 31.

It should be noted that, when first reinforcing member 4 and second reinforcing member 5 are provided, connection member 3 is also supplied between first reinforcing member 4 and each of first back surface 1c and second front surface 2b, and between second reinforcing member 5 and each of first front surface 1b and second back surface 2c, as shown in FIG. 11A. In this case, prior to joining, flux may also be applied to first back surface 1c of first superconducting wire rod 1, second back surface 2c of second superconducting wire rod 2, a surface of first reinforcing member 4 on a side facing second front surface 2b, a surface of second reinforcing member 5 on a side facing first front surface 1b, and surfaces of connection member 3.

Figure 10B:
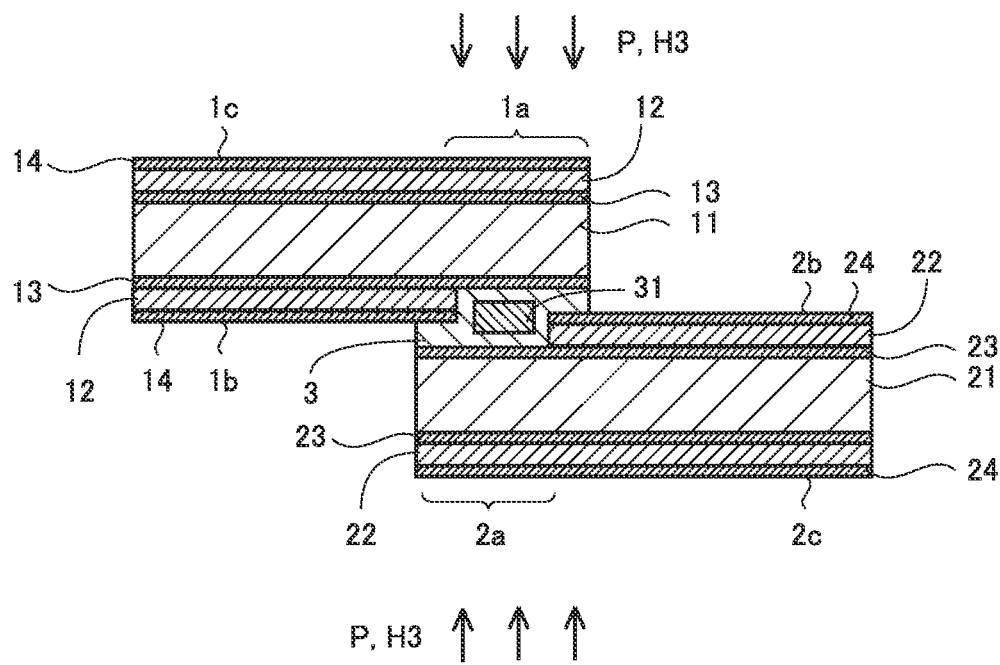
FIG. 10B is a cross sectional view of the superconducting wire in accordance with the first embodiment at the time of joining in the wire rod joining step.

FIG. 10B is a cross sectional view of the superconducting wire in accordance with the first embodiment at the time of joining in wire rod joining step S2. Thereafter, as shown in FIG. 10B, joining of first superconducting wire rod 1 and second superconducting wire rod 2 is performed. More specifically, pressure P is applied to a portion where first superconducting wire rod 1 and second superconducting wire rod 2 overlap. Preferably, pressure P is uniformly maintained from when application of heat H3 described later is started to when cooling is finished. Thereafter, heat H3 is applied to first superconducting wire rod 1 and second superconducting wire rod 2. By heat H3, connection member 3 is melted, whereas first internal connection members 13, first surface connection members 14, second internal connection members 23, and second surface connection members 24 are not melted. The heating time for which heat H3 is applied is preferably more than or equal to 10 seconds. After the heating time is finished, cooling is performed using a cooling fan or the like, for example. Cooling is preferably performed until the temperature becomes less than or equal to 50° C. for safety reasons. Thereby, joining of first superconducting wire rod 1 and second superconducting wire rod 2 is performed.

Figure 11B:
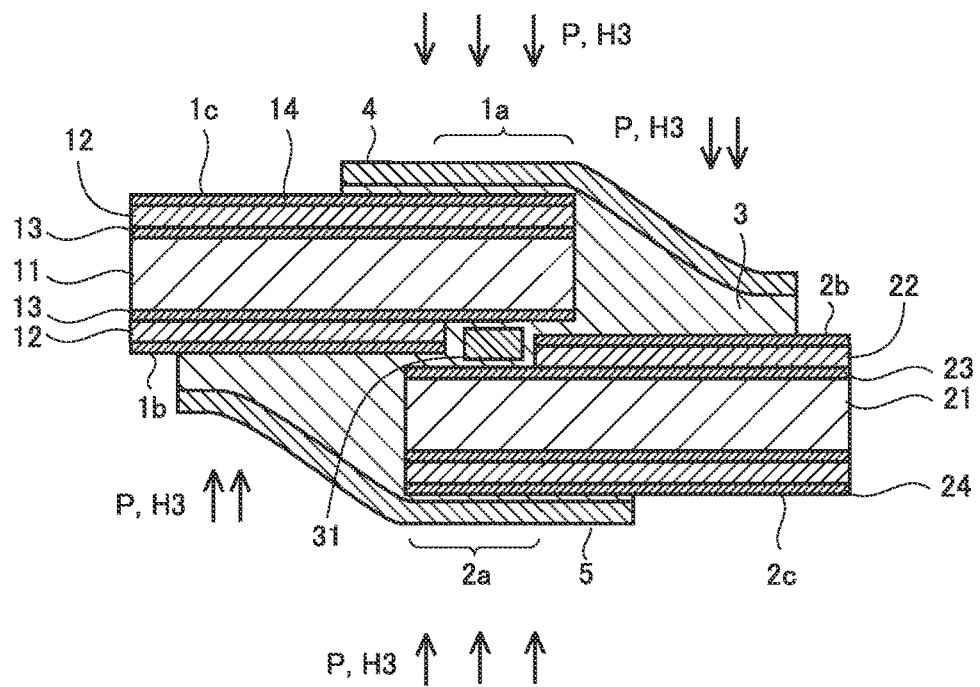
FIG. 11B is a cross sectional view of the superconducting wire in accordance with the third variation of the first embodiment at the time of joining in the wire rod joining step.

FIG. 11B is a cross sectional view of the superconducting wire in accordance with the third variation of the first embodiment at the time of joining in wire rod joining step S2. When first reinforcing member 4 and second reinforcing member 5 are provided, pressure P is applied to a portion where first reinforcing member 4 and second reinforcing layer 22 on the second front surface 2b side overlap and a portion where second reinforcing member 5 and first reinforcing layer 12 on the first front surface 1b side overlap, as shown in FIG. 11B. Preferably, pressure P is uniformly maintained from when application of heat H3 described later is started to when cooling is finished. Thereafter, heat H3 is applied to first superconducting wire rod 1 and second superconducting wire rod 2. By heat H3, connection member 3 is melted, whereas first internal connection members 13, first surface connection members 14, second internal connection members 23, and second surface connection members 24 are not melted. The heating time for which heat H3 is applied is preferably more than or equal to 10 seconds. After the heating time is finished, cooling is performed using a cooling fan or the like, for example. Cooling is preferably performed until the temperature becomes less than or equal to 50° C. for safety reasons. Thereby, connection member 3 is melted, first reinforcing member 4 is joined to second reinforcing layer 22 on the second front surface 2b side, and second reinforcing member 5 is joined to first reinforcing layer 12 on the first front surface 1b side.

The effect of the superconducting wire in accordance with the first embodiment will be described below in comparison with comparative examples.

Figure 12:
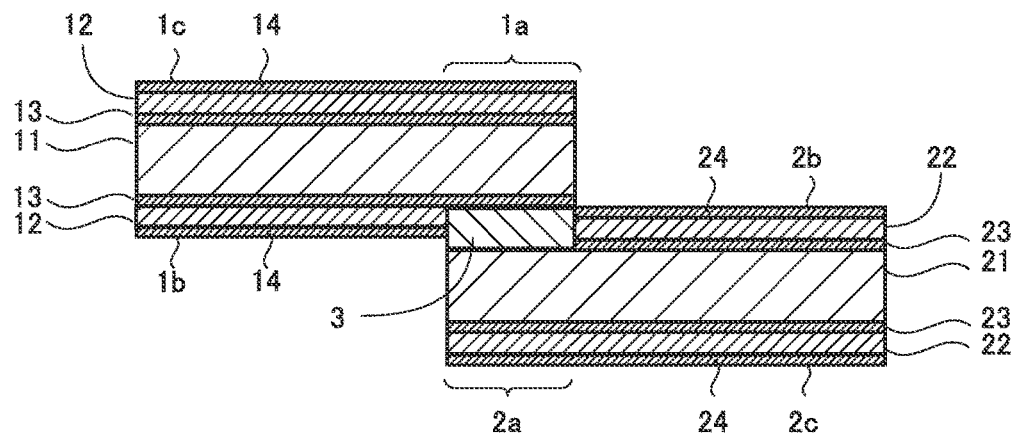
FIG. 12 is a cross sectional view of a superconducting wire in accordance with a first comparative example.

First, a structure of a superconducting wire in accordance with a comparative example will be described. FIG. 12 is a cross sectional view of a superconducting wire in accordance with a first comparative example. As shown in FIG. 12, the superconducting wire in accordance with the first comparative example has first superconducting wire rod 1, second superconducting wire rod 2, and connection member 3. Structures of first superconducting wire rod 1 and second superconducting wire rod 2 of the superconducting wire in accordance with the first comparative example are the same as those of the superconducting wire in accordance with the first embodiment.

However, in the superconducting wire in accordance with the first comparative example, first superconducting wire rod 1 and second superconducting wire rod 2 are joined by connection member 3 such that the first front surface 1b side of first superconducting layer 11 located at first edge portion 1a faces the second front surface 2b side of second superconducting layer 21 located at second edge portion 2a. In the superconducting wire in accordance with the first comparative example, edges of a portion where the first front surface 1b side of first superconducting layer 11 located at first edge portion 1a is joined to the second front surface 2b side of second superconducting layer 21 located at second edge portion 2a serve as stress-concentration locations. Further, in the superconducting wire in accordance with the first comparative example, there is a location where first reinforcing layer 12 and second reinforcing layer 22 are not joined midway in the longitudinal direction (the reinforcing layers are not continuous).

Next, results of a bending test and a tensile test performed on the superconducting wire in accordance with the first embodiment and the superconducting wire in accordance with the first comparative example will be described. In each of the superconducting wire in accordance with the first embodiment and the superconducting wire in accordance with the first comparative example used for the bending test and the tensile test, first superconducting wire rod 1 and second superconducting wire rod 2 have a width of 4.5 mm and a thickness of 0.31 mm, first internal connection members 13 and second internal connection members 23 are made of Pb-free solder, connection member 3 is made of PbSn eutectic solder, first reinforcing layers 12 and second reinforcing layers 22 are made of an Ni alloy, and an overlapping length of first superconducting wire rod 1 and second superconducting wire rod 2 (lap length) is 20 mm.

Figure 13:
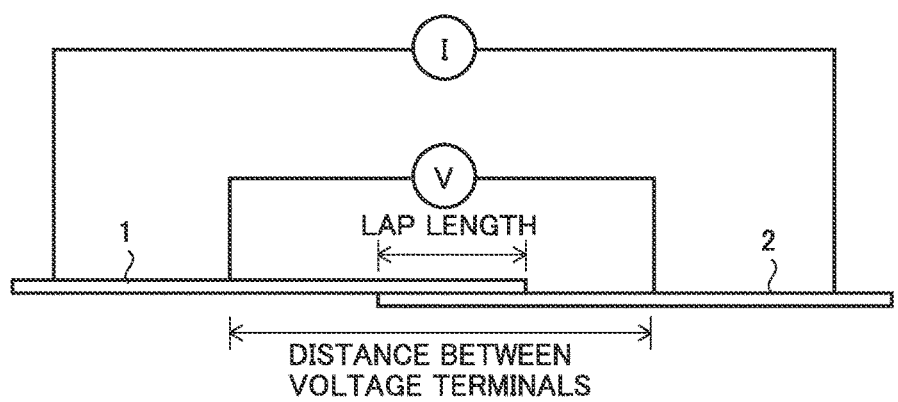
FIG. 13 is a schematic view of critical current measurement.

Prior to the bending test and the tensile test, critical current measurement is performed on the superconducting wire in accordance with the first embodiment and the superconducting wire in accordance with the first comparative example. FIG. 13 is a schematic view of the critical current measurement. As shown in FIG. 13, this critical current measurement is performed by obtaining a current-voltage curve in liquid nitrogen by a four-terminal method in which a distance between voltage terminals is set to 220 mm and a portion where first superconductive wire rod 1 and second superconductive wire rod 2 are joined is positioned at the center of the voltage terminal, and reading a current value based on a curve calculated to remove a resistance component complying with Ohm's law from the obtained curve at an electric field criteria of 1 µV/cm.

The bending test is performed by performing the critical current measurement on each of the superconducting wire in accordance with the first embodiment and the superconducting wire in accordance with the first comparative example which have been subjected to both bending, and measuring a bending radius (allowable bending diameter) obtained when each superconducting wire subjected to the both bending has a critical current lower than 95% of the critical current measured prior to the bending test. It should be noted that the both bending is performed by bending first superconducting wire rod 1 to follow a jig having a predetermined diameter and thereafter also bending second superconducting wire rod 2 to follow the jig, at room temperature. When each superconducting wire has a critical current more than 95% of the critical current measured prior to the bending test as a result of being subjected to the both bending and thereafter subjected to the critical current measurement, the both bending using a jig having a smaller diameter and the critical current measurement are repeated again.

When the above bending test was performed on each of first superconducting wire rod 1 and second superconducting wire rod 2, each superconducting wire rod had an allowable bending diameter of 40 mm. When the above bending test was performed on the superconducting wire in accordance with the first comparative example, the superconducting wire in accordance with the first comparative example had an allowable bending diameter of 180 mm (4.5 times that of each of first superconducting wire rod 1 and second superconducting wire rod 2). On the other hand, when the above bending test was performed on the superconducting wire in accordance with the first embodiment, the superconducting wire in accordance with the first embodiment had an allowable bending diameter of 80 mm (double that of each of first superconducting wire rod 1 and second superconducting wire rod 2). Namely, the superconducting wire in accordance with the first embodiment exhibited a bending property 2.25 times excellent when compared with that of the superconducting wire in accordance with the first comparative example. It should be noted that, when conducting member 31 was provided in the superconducting wire in accordance with the first embodiment, the superconducting wire had an allowable bending diameter of 90 mm.

The tensile test is performed in liquid nitrogen. The tensile test is performed by performing the critical current measurement on each of the superconducting wire in accordance with the first embodiment and the superconducting wire in accordance with the first comparative example with a predetermined tensile force being applied thereto, and measuring a tensile force obtained when each superconducting wire with the tensile force being applied thereto has a critical current lower than 95% of the critical current measured prior to the tensile test. An allowable tensile strength is calculated by dividing the tension force by a wire rod width, and further by a wire rod thickness (When first reinforcing layers 12 and second reinforcing layers 22 are made of the same material, average values of wire rod widths and wire rod thicknesses of first superconducting wire rod 1 and second superconducting wire rod 2 are used as the wire rod width and the wire rod thickness. When first reinforcing layers 12 and second reinforcing layers 22 are made of different materials, a wire rod width and a wire rod thickness of one of first superconducting wire rod 1 and second superconducting wire rod 2 which has a lower tensile strength are used as the wire rod width and the wire rod thickness). It should be noted that, when each superconducting wire has a critical current more than 95% of the critical current measured prior to the tensile test as a result of being subjected to the critical current measurement with the tensile force being applied, the critical current measurement are repeated again with a higher tensile force being applied.

When the above tensile test was performed on each of first superconducting wire rod 1 and second superconducting wire rod 2, each superconducting wire rod had an allowable tensile stress of 424 MPa. When the above tensile test was performed on the superconducting wire in accordance with the first comparative example, the superconducting wire in accordance with the first comparative example had an allowable tensile strength of 165 MPa (39% of that of each of first superconducting wire rod 1 and second superconducting wire rod 2). On the other hand, when the above tensile test was performed on the superconducting wire in accordance with the first embodiment, the superconducting wire in accordance with the first embodiment had an allowable tensile strength of 389 MPa (91% of that of each of first superconducting wire rod 1 and second superconducting wire rod 2). Namely, the superconducting wire in accordance with the first embodiment exhibited a tensile property 2.33 times excellent when compared with that of the superconducting wire in accordance with the first comparative example. It should be noted that, when conducting member 31 was provided in the superconducting wire in accordance with the first embodiment, the superconducting wire had an allowable tensile strength of 389 MPa.

As described above, the superconducting wire in accordance with the first comparative example has stress-concentration locations, and the reinforcing layers are not continuous midway in the longitudinal direction. On the other hand, the superconducting wire in accordance with the first embodiment does not have a significant stress-concentration location, and first reinforcing layer 12 and second reinforcing layer 22 are joined continuously in the longitudinal direction. Therefore, with the superconducting wire in accordance with the first embodiment, good mechanical properties against bending deformation, tensile deformation, and the like can be achieved, as indicated by the result of the bending test described above.

It should be noted that, since first reinforcing layer 12 on the first front surface 1b side located at first edge portion 1a is not provided (or is thinner than first reinforcing layer 12 on the first front surface 1b side located at other than first edge portion 1a) and second reinforcing layer 22 on the second front surface 2b side located at second edge portion 2a is not provided (or is thinner than second reinforcing layer 22 on the second front surface 2b side located at other than second edge portion 2a) in the superconducting wire in accordance with the first embodiment, an increase in connection resistance due to the fact that first reinforcing layer 12 and second reinforcing layer 22 are located between first superconducting layer 11 and second superconducting layer 21 is suppressed. A description will be given below in this regard.

First, a structure of a superconducting wire in accordance with a second comparative example will be described.

Figure 14:
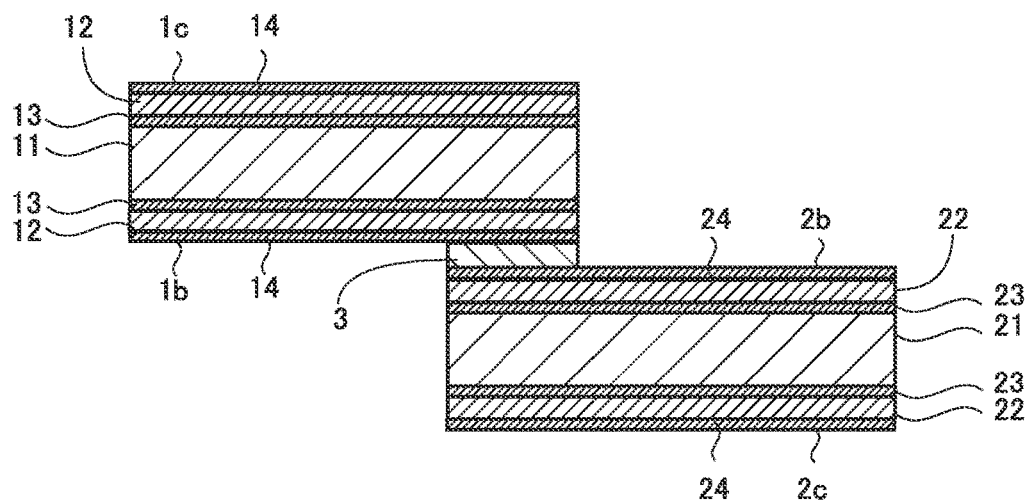
FIG. 14 is a cross sectional view of a superconducting wire in accordance with a second comparative example.

FIG. 14 is a cross sectional view of the superconducting wire in accordance with the second comparative example. As shown in FIG. 14, the superconducting wire in accordance with the second comparative example has first superconducting wire rod 1, second superconducting wire rod 2, and connection member 3. First superconducting wire rod 1 and second superconducting wire rod 2 are joined by connection member 3 such that first front surface 1b located at first edge portion 1a faces second front surface 2b located at second edge portion 2a.

First superconducting wire rod 1 in the superconducting wire in accordance with the second comparative example is different from that in the superconducting wire in accordance with the first embodiment in that first reinforcing layer 12 on the first front surface 1b side located at first edge portion 1a and first reinforcing layer 12 on the first front surface 1b side located at other than first edge portion 1a have the same thickness. Further, second superconducting wire rod 2 in the superconducting wire in accordance with the second comparative example is different from that in the superconducting wire in accordance with the first embodiment in that second reinforcing layer 22 on the second front surface 2b side located at second edge portion 2a and second reinforcing layer 22 on the second front surface 2b side located at other than second edge portion 2a have the same thickness.

Next, a connection resistance measurement test performed on the superconducting wire in accordance with the first embodiment and the superconducting wire in accordance with the second comparative example will be described. In each of the superconducting wire in accordance with the first embodiment and the superconducting wire in accordance with the second comparative example, first superconducting wire rod 1 and second superconducting wire rod 2 have a width of 4.5 mm and a thickness of 0.31 mm, first internal connection members 13 and second internal connection members 23 are made of Pb-free solder, connection member 3 is made of PbSn eutectic solder, first reinforcing layers 12 and second reinforcing layers 22 are made of an Ni alloy, and an overlapping length of first superconducting wire rod 1 and second superconducting wire rod 2 (lap length) is 20 mm.

It should be noted that this connection resistance measurement test is performed by obtaining a current-voltage curve in liquid nitrogen by a four-terminal method in which a distance between voltage terminals is set to 220 mm and a portion where first superconducting wire rod 1 and second superconducting wire rod 2 are joined is positioned at the center of the voltage terminal, and calculating an inclination of a resistance component complying with Ohm's law from the obtained curve.

When the above connection resistance measurement test was performed on the superconducting wire in accordance with the second comparative example, the superconducting wire in accordance with the second comparative example had a connection resistance of 696 nΩ. On the other hand, when the above connection resistance measurement test was performed on the superconducting wire in accordance with the first embodiment, the superconducting wire in accordance with the first embodiment had a connection resistance of 109 nΩ. The superconducting wire in accordance with the first embodiment exhibited a connection resistance 6.39 times excellent when compared with that of the superconducting wire in accordance with the first comparative example. It should be noted that, when conducting member 31 was provided in the superconducting wire in accordance with the first embodiment, the superconducting wire had a connection resistance of 73 nΩ.

It should be noted that, when the above bending test and tensile test were performed on the superconducting wire in accordance with the second comparative example for reference, the superconducting wire had an allowable bending diameter of 150 mm, and an allowable tensile strength of 424 MPa.

As described above, in the superconducting wire in accordance with the first embodiment, first reinforcing layer 12 on the first front surface 1b side located at first edge portion 1a is not provided (or is thinner than first reinforcing layer 12 on the first front surface 1b side located at other than first edge portion 1a) and second reinforcing layer 22 on the second front surface 2b side located at second edge portion 2a is not provided (or is thinner than second reinforcing layer 22 on the second front surface 2b side located at other than second edge portion 2a). On the other hand, in the superconducting wire in accordance with the second comparative example, first reinforcing layer 12 on the first front surface 1b side located at first edge portion 1a and other than first edge portion 1a has a uniform thickness, and second reinforcing layer 22 on the second front surface 2b side located at second edge portion 2a and other than second edge portion 2a has a uniform thickness.

Namely, in the superconducting wire in accordance with the first embodiment, first reinforcing layer 12 and second reinforcing layer 22 having a relatively high electric resistance value arranged between first superconducting layer 11 and second superconducting layer 21 have thicknesses thinner than those in the superconducting wire in accordance with the second comparative example. Therefore, an increase in connection resistance is suppressed in the superconducting wire in accordance with the first embodiment.

When first reinforcing layer 12 on the first front surface 1b side located at first edge portion 1a is entirely removed and second reinforcing layer 22 on the second front surface 2b side located at second edge portion 2a is entirely removed in the superconducting wire in accordance with the first embodiment, first reinforcing layer 12 and second reinforcing layer 22 having a relatively high electric resistance value arranged between first superconducting layer 11 and second superconducting layer 21 have further thinner thicknesses. Therefore, in this case, the value of connection resistance can be further reduced.

When conducting member 31 is provided in connection member 3 in the superconducting wire in accordance with the first embodiment, connection resistance between first superconducting layer 11 and second superconducting layer 21 can be further reduced, because conducting member 31 has an electric resistance value lower than that of connection member 3.

When the superconducting wire in accordance with the first embodiment has first reinforcing member 4 and second reinforcing member 5, first reinforcing member 4 and second reinforcing member 5 reinforce joining of first superconducting wire rod 1 and second superconducting wire rod 2 by connection member 3. Therefore, in this case, better mechanical properties against bending deformation, tensile deformation, and the like can be achieved.

When first reinforcing layers 12 produce compressive strain on first superconducting layer 11 and second reinforcing layers 22 produce compressive strain on second superconducting layer 21 in the superconducting wire in accordance with the first embodiment, tensile stress which occurs in first superconducting layer 11 and second superconducting layer 21 when bending deformation, tensile deformation, or the like is applied thereto is relaxed. Therefore, in this case, better mechanical properties against bending deformation, tensile deformation, and the like can be achieved.

When the compressive strain on first superconducting layer 11 located at first edge portion 1a is smaller than the compressive strain on the first superconducting layer located at other than first edge portion 1a, and the compressive strain on second superconducting layer 21 located at second edge portion 2a is smaller than the compressive strain on second superconducting layer 21 located at other than second edge portion 2a in the superconducting wire in accordance with the first embodiment, first edge portion 1a and second edge portion 2a have a small warpage when first reinforcing layer 12 on the first front surface 1b side located at first edge portion 1a and second reinforcing layer 22 on the second front surface 2b side located at second edge portion 2a are removed. Therefore, in this case, first edge portion 1a and second edge portion 2a can each have a larger width, and as a result, connection resistance between first superconducting wire rod 1 and second superconducting wire rod 2 can be further reduced.

Second Embodiment

Hereinafter, a superconducting wire in accordance with a second embodiment will be described. It should be noted that differences from the first embodiment will be mainly described herein.

Figure 15:
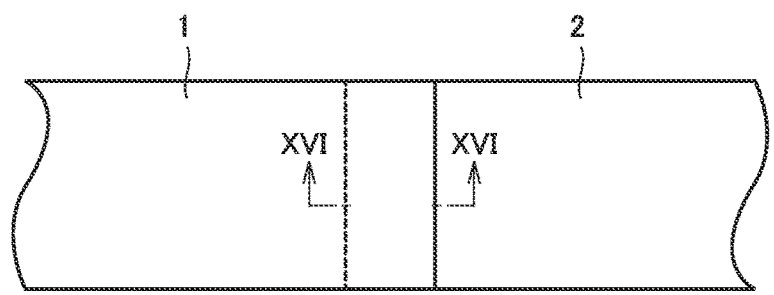
FIG. 15 is a top view of a superconducting wire in accordance with a second embodiment.

A structure of the superconducting wire in accordance with the second embodiment will be described below. FIG. 15 is a top view of the superconducting wire in accordance with the second embodiment. As shown in FIG. 15, the superconducting wire in accordance with the second embodiment has first superconducting wire rod 1, second superconducting wire rod 2, and connection member 3 (see FIG. 16A), as with the superconducting wire in accordance with the first embodiment.

Figure 16A:
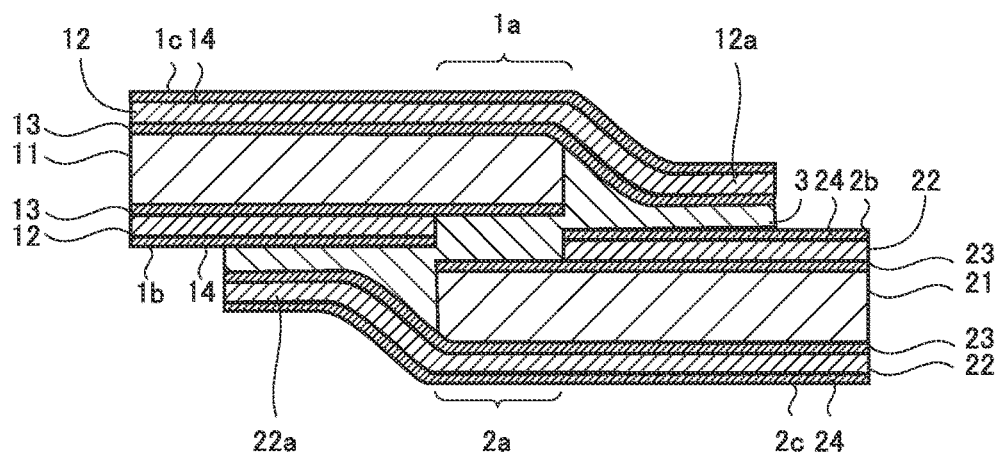
FIG. 16A is a cross sectional view at a portion where a first superconducting wire rod and a second superconducting wire rod are joined in the superconducting wire in accordance with the second embodiment.
Figure 16B:
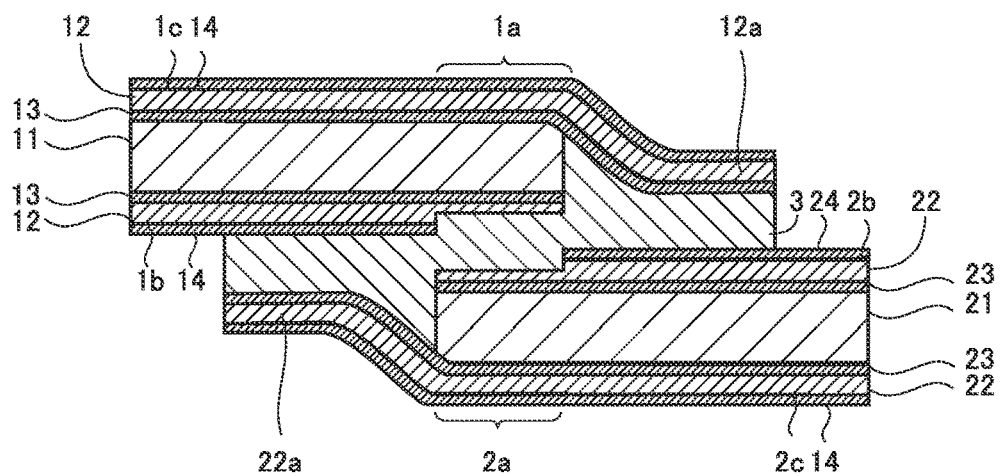
FIG. 16B is a cross sectional view at a portion where a first superconducting wire rod and a second superconducting wire rod are joined in a superconducting wire in accordance with a variation of the second embodiment.

FIG. 16A is a cross sectional view at a portion where first superconducting wire rod 1 and second superconducting wire rod 2 are joined in the superconducting wire in accordance with the second embodiment. FIG. 16B is a cross sectional view at a portion where first superconducting wire rod 1 and second superconducting wire rod 2 are joined in a superconducting wire in accordance with a variation of the second embodiment. As shown in FIGS. 16A and 16B, the shape of first reinforcing layer 12 on the first back surface 1c side of first superconducting wire rod 1 and the shape of second reinforcing layer 22 on the second back surface 2c side of second superconducting wire rod 2 are different from those of the superconducting wire in accordance with the first embodiment.

Specifically, first reinforcing layer 12 on the first back surface 1c side has a first protruding portion 12a protruding from first edge portion 1a. First protruding portion 12a is joined to second reinforcing layer 22 on the second front surface 2b side by connection member 3. Second reinforcing layer 22 on the second back surface 2c side has a second protruding portion 22a protruding from second edge portion 2a. Second protruding portion 22a is joined to first reinforcing layer 12 on the first front surface 1b side by connection member 3.

First front surface 1b located at first edge portion 1a is arranged to face second front surface 2b located at second edge portion 2a, and is joined to second front surface 2b located at second edge portion 2a by connection member 3. The superconducting wire in accordance with the second embodiment is also different from the superconducting wire in accordance with the first embodiment in this regard.

Specifically, as shown in FIG. 16A, first internal connection member 13 on first front surface 1b located at first edge portion 1a is joined to second internal connection member 23 on second front surface 2b located at second edge portion 2a. It should be noted that, when first reinforcing layer 12 is provided on the first front surface 1b side of first superconducting layer 11 located at first edge portion 1a, and second reinforcing layer 22 is provided on the second front surface 2b side of the second superconducting layer located at second edge portion 2a as shown in FIG. 16B, first reinforcing layer 12 on the first front surface 1b side located at first edge portion 1a is joined to second reinforcing layer 22 on the second front surface 2b side located at second edge portion 2a by connection member 3.

A method for manufacturing the superconducting wire in accordance with the second embodiment will be described below.

Figure 17:
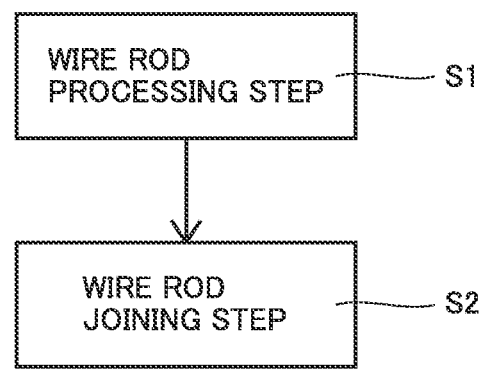
FIG. 17 is a process chart of a method for manufacturing the superconducting wire in accordance with the second embodiment.

FIG. 17 is a process chart of the method for manufacturing the superconducting wire in accordance with the second embodiment. As shown in FIG. 17, the method for manufacturing the superconducting wire in accordance with the second embodiment has wire rod processing step S1 and wire rod joining step S2, as with the method for manufacturing the superconducting wire in accordance with the first embodiment.

However, wire rod joining step S2 in the method for manufacturing the superconducting wire in accordance with the second embodiment is different from wire rod joining step S2 in the method for manufacturing the superconducting wire in accordance with the first embodiment.

Figure 18A:
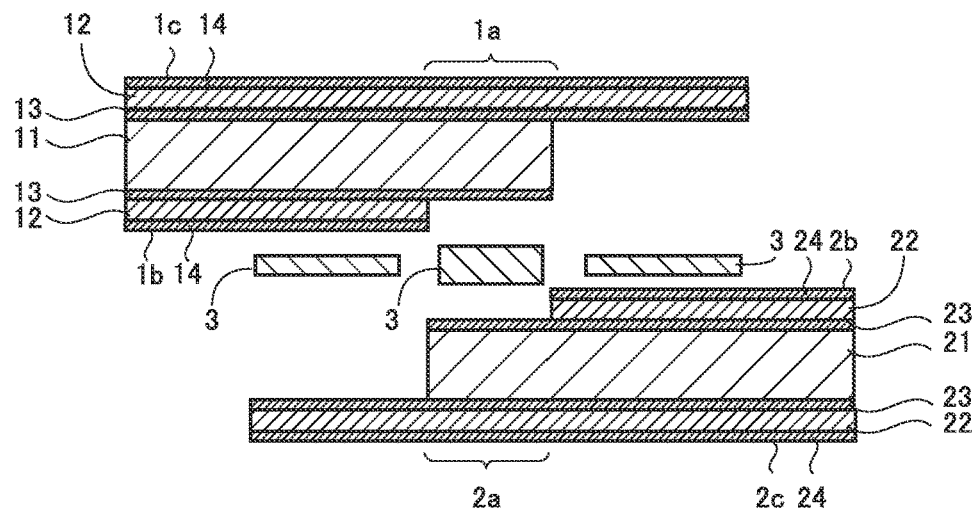
FIG. 18A is a cross sectional view of the superconducting wire in accordance with the second embodiment before joining in a wire rod joining step.

FIG. 18A is a cross sectional view of the superconducting wire in accordance with the second embodiment before joining in wire rod joining step S2. As shown in FIG. 18A, in wire rod joining step S2, first superconducting wire rod 1 and second superconducting wire rod 2 are arranged such that first front surface 1b located at first edge portion 1a faces second front surface 2b located at second edge portion 2a. As a result, first superconducting wire rod 1 and second superconducting wire rod 2 are arranged such that first protruding portion 12a faces second front surface 2b and second protruding portion 22a faces first front surface 1b.

On this occasion, connection member 3 is supplied between first front surface 1b located at first edge portion 1a and second front surface 2b located at second edge portion 2a, between first protruding portion 12a and second front surface 2b, and between second protruding portion 22a and first front surface 1b. It should be noted that, prior to joining, flux may be applied to first front surface 1b of first superconducting wire rod 1, second front surface 2b of second superconducting wire rod 2, a surface of first protruding portion 12a on a side facing second front surface 2b, a surface of second protruding portion 22a on a side facing first front surface 1b, and surfaces of connection member 3.

Figure 18B:
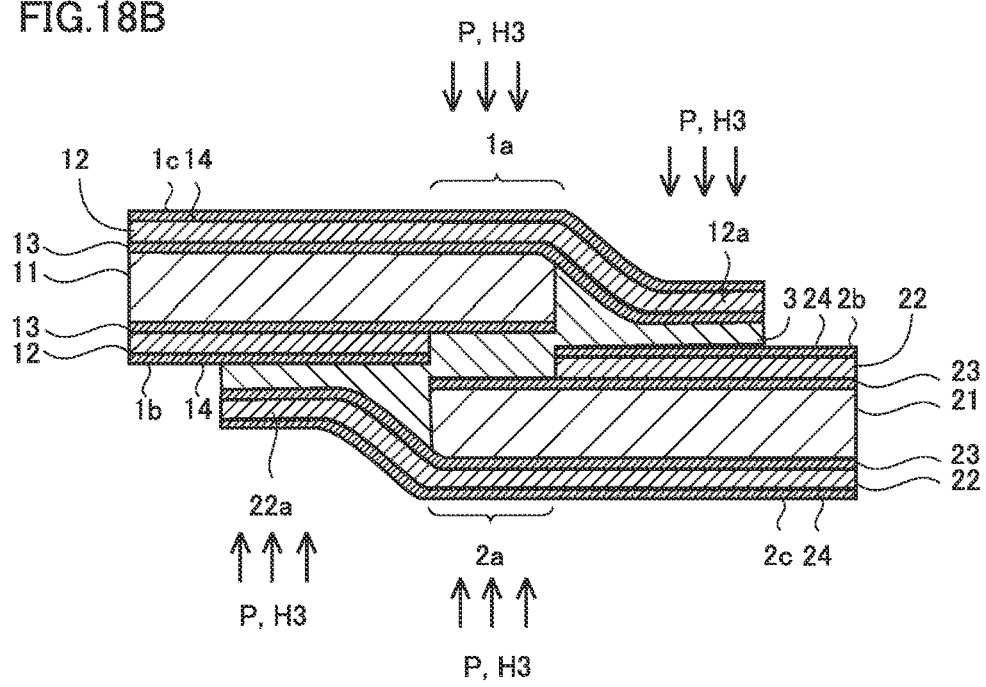
FIG. 18B is a cross sectional view of the superconducting wire in accordance with the second embodiment at the time of joining in the wire rod joining step.

FIG. 18B is a cross sectional view of the superconducting wire in accordance with the second embodiment at the time of joining in wire rod joining step S2. Thereafter, as shown in FIG. 18B, joining of first superconducting wire rod 1 and second superconducting wire rod 2 is performed. More specifically, heat H3 and pressure P are applied to a portion where first superconducting wire rod 1 and second superconducting wire rod 2 overlap. Thereby, connection member 3 is melted, and joining of first superconducting wire rod 1 and second superconducting wire rod 2 is performed.

The effect of the superconducting wire in accordance with the second embodiment will be described below.

As described above, in the superconducting wire in accordance with the second embodiment, first front surface 1b located at first edge portion 1a is arranged to face second front surface 2b located at second edge portion 2a, and is joined to second front surface 2b located at second edge portion 2a by connection member 3. Therefore, the superconducting wire in accordance with the second embodiment has stress-concentration locations at edges of a joining portion between first front surface 1b located at first edge portion 1a and second front surface 2b located at second edge portion 2a, as in the superconducting wire in accordance with the first comparative example.

However, in the superconducting wire in accordance with the second embodiment, first reinforcing layer 12 on the first back surface 1c side protrudes from first edge portion 1a, and is joined to second reinforcing layer 22 on the second front surface 2b side. Further, in the superconducting wire in accordance with the second embodiment, second reinforcing layer 22 on the second back surface 2c side protrudes from second edge portion 2a, and is joined to first reinforcing layer 12 on the first front surface 1b side.

Therefore, the joining portion between first front surface 1b located at first edge portion 1a and second front surface 2b located at second edge portion 2a is reinforced by first reinforcing layer 12 on the first back surface 1c side and second reinforcing layer 22 on the second back surface 2c side. As a result, with the superconducting wire in accordance with the second embodiment, good mechanical properties against bending deformation, tensile deformation, and the like can be achieved.

Third Embodiment

Hereinafter, a superconducting wire in accordance with a third embodiment will be described. It should be noted that differences from the first embodiment will be mainly described herein.

Figure 19:
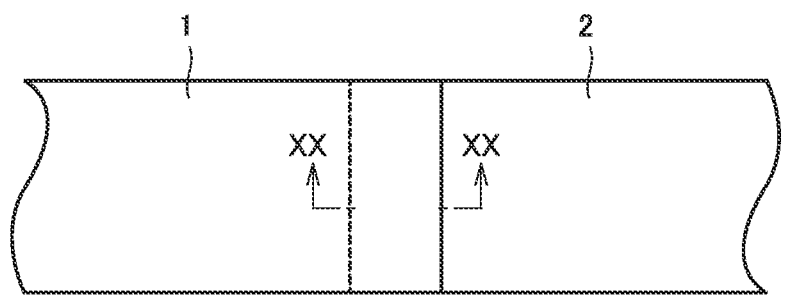
FIG. 19 is a top view of a superconducting wire in accordance with a third embodiment.

A structure of the superconducting wire in accordance with the third embodiment will be described below. FIG. 19 is a top view of the superconducting wire in accordance with the third embodiment. As shown in FIG. 19, the superconducting wire in accordance with the third embodiment has first superconducting wire rod 1, second superconducting wire rod 2, and connection member 3 (see FIG. 20A), as with the superconducting wire in accordance with the first embodiment.

Figure 20A:
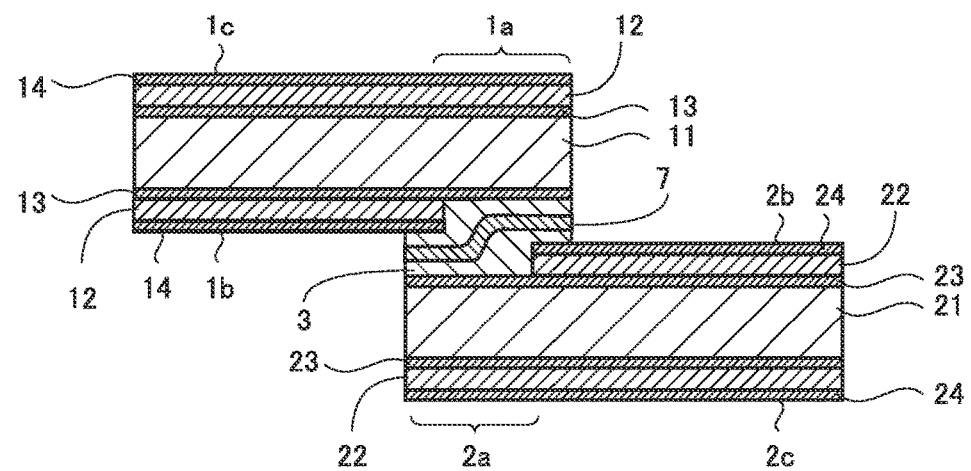
FIG. 20A is a cross sectional view at a portion where a first superconducting wire rod and a second superconducting wire rod are joined in the superconducting wire in accordance with the third embodiment.
Figure 20B:
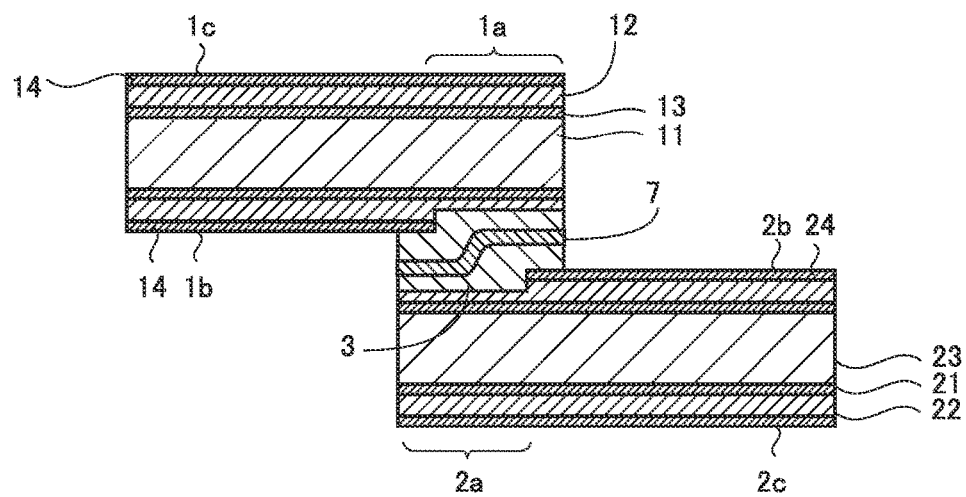
FIG. 20B is a cross sectional view at a portion where a first superconducting wire rod and a second superconducting wire rod are joined in a superconducting wire in accordance with a first variation of the third embodiment.

FIG. 20A is a cross sectional view at a portion where first superconducting wire rod 1 and second superconducting wire rod 2 are joined in the superconducting wire in accordance with the third embodiment. FIG. 20B is a cross sectional view at a portion where first superconducting wire rod 1 and second superconducting wire rod 2 are joined in a superconducting wire in accordance with a first variation of the third embodiment. As shown in FIGS. 20A and 20B, the superconducting wire in accordance with the third embodiment is different from the superconducting wire in accordance with the first embodiment in that it has a third reinforcing member 7.

As shown in FIGS. 20A and 20B, in the superconducting wire in accordance with the third embodiment, first superconducting wire rod 1 and second superconducting wire rod 2 are arranged such that first front surface 1b located at first edge portion 1a faces second front surface 2b located at other than second edge portion 2a, and second front surface 2b located at second edge portion 2a faces first front surface 1b located at other than first edge portion 1a.

Specifically, when first reinforcing layer 12 on the first front surface 1b side located at first edge portion 1a and second reinforcing layer 22 on the second front surface 2b side located at second edge portion 2a are entirely removed as shown in FIG. 20A, first internal connection member 13 on the first front surface 1b side located at first edge portion 1a faces second surface connection member 24 on the second front surface 2b side located at other than second edge portion 2a, and second internal connection member 23 on the second front surface 2b side located at second edge portion 2a faces first surface connection member 14 on the first front surface 1b side located at other than first edge portion 1a.

Further, when first reinforcing layer 12 is provided on the first front surface 1b side located at first edge portion 1a and second reinforcing layer 22 is provided on the second front surface 2b side located at second edge portion 2a as shown in FIG. 20B, first reinforcing layer 12 on the first front surface 1b side located at first edge portion 1a faces second surface connection member 24 on the second front surface 2b side located at other than second edge portion 2a, and second reinforcing layer 22 on the second front surface 2b side located at second edge portion 2a faces first surface connection member 14 on the first front surface 1b side located at other than first edge portion 1a.

Third reinforcing member 7 is provided between first front surface 1b and second front surface 2b, at least partially in a portion where first superconducting wire rod 1 and second superconducting wire rod 2 overlap. Preferably, third reinforcing member 7 is provided between first front surface 1b and second front surface 2b, over the entire length of the portion where first superconducting wire rod 1 and second superconducting wire rod 2 overlap.

More specifically, third reinforcing member 7 is provided between first front surface 1b located at first edge portion 1a and second front surface 2b located at other than second edge portion 2a, between first front surface 1b located at first edge portion 1a and second front surface 2b located at second edge portion 2a, and between first front surface 1b located at other than first edge portion 1a and second front surface 2b located at second edge portion 2a.

Figure 21A:
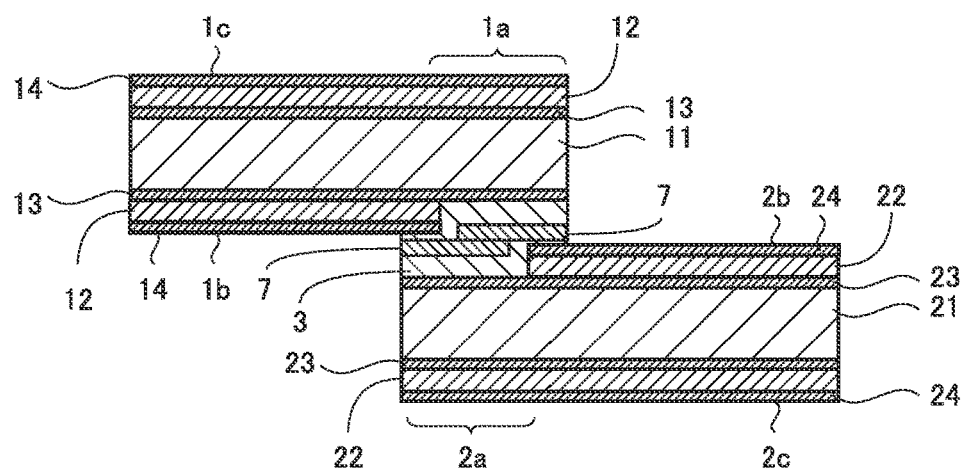
FIG. 21A is a cross sectional view at a portion where a first superconducting wire rod and a second superconducting wire rod are joined in a superconducting wire in accordance with a second variation of the third embodiment.
Figure 21B:
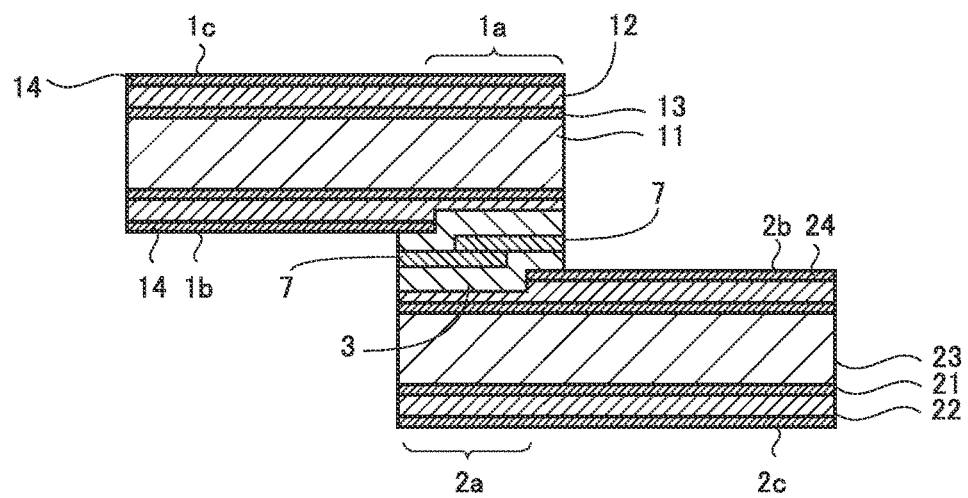
FIG. 21B is a cross sectional view at a portion where a first superconducting wire rod and a second superconducting wire rod are joined in a superconducting wire in accordance with a third variation of the third embodiment.

FIG. 21A is a cross sectional view at a portion where a first superconducting wire rod and a second superconducting wire rod are joined in a superconducting wire in accordance with a second variation of the third embodiment. FIG. 21B is a cross sectional view at a portion where a first superconducting wire rod and a second superconducting wire rod are joined in a superconducting wire in accordance with a third variation of the third embodiment. As shown in FIGS. 21A and 21B, third reinforcing member 7 may be constituted by a plurality of members.

Third reinforcing member 7 is joined to first front surface 1b of first superconducting wire rod 1 and second front surface 2b of second superconducting wire rod 2, using connection member 3.

Preferably, third reinforcing member 7 has an electric resistance value lower than that of connection member 3. Preferably, third reinforcing member 7 has a strength higher than that of connection member 3. The material to be used for the third reinforcing member is a Cu alloy, for example.

A method for manufacturing the superconducting wire in accordance with the third embodiment will be described below.

Figure 22:
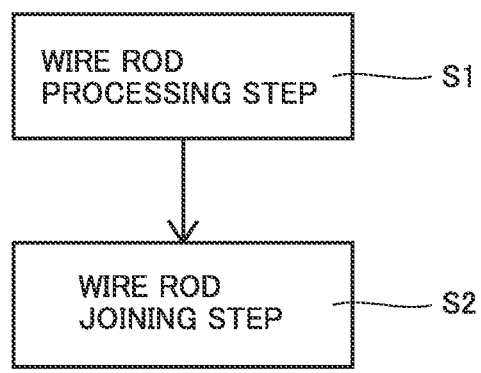
FIG. 22 is a process chart of a method for manufacturing the superconducting wire in accordance with the third embodiment.

FIG. 22 is a process chart of the method for manufacturing the superconducting wire in accordance with the third embodiment. As shown in FIG. 22, the method for manufacturing the superconducting wire in accordance with the third embodiment has wire rod processing step S1 and wire rod joining step S2. Wire rod processing step S1 in the method for manufacturing the superconducting wire in accordance with the third embodiment is the same as that of the first embodiment.

Figure 23A:
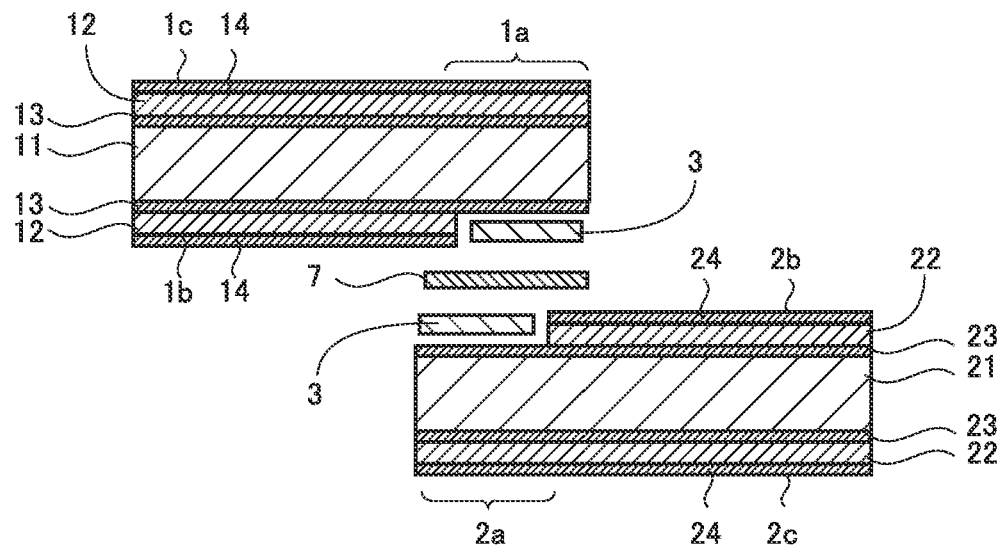
FIG. 23A is a cross sectional view of the superconducting wire in accordance with the third embodiment before joining in a wire rod joining step.

FIG. 23A is a cross sectional view of the superconducting wire in accordance with the third embodiment before joining in wire rod joining step S2. As shown in FIG. 23A, in wire rod joining step S2, first superconducting wire rod 1 and second superconducting wire rod 2 are arranged such that first front surface 1b located at first edge portion 1a faces second front surface 2b located at other than second edge portion 2a, and second front surface 2b located at second edge portion 2a faces first front surface 1b located at other than first edge portion 1a.

On this occasion, third reinforcing member 7 is inserted between first front surface 1b and second front surface 2b, at least partially in the portion where first superconducting wire rod 1 and second superconducting wire rod 2 overlap. Further, connection member 3 is supplied between third reinforcing member 7 and first front surface 1b, and between third reinforcing member 7 and second front surface 2b. It should be noted that, prior to joining, flux may be applied to first front surface 1b of first superconducting wire rod 1, second front surface 2b of second superconducting wire rod 2, surfaces of third reinforcing member 7, and surfaces of connection member 3.

Figure 23B:
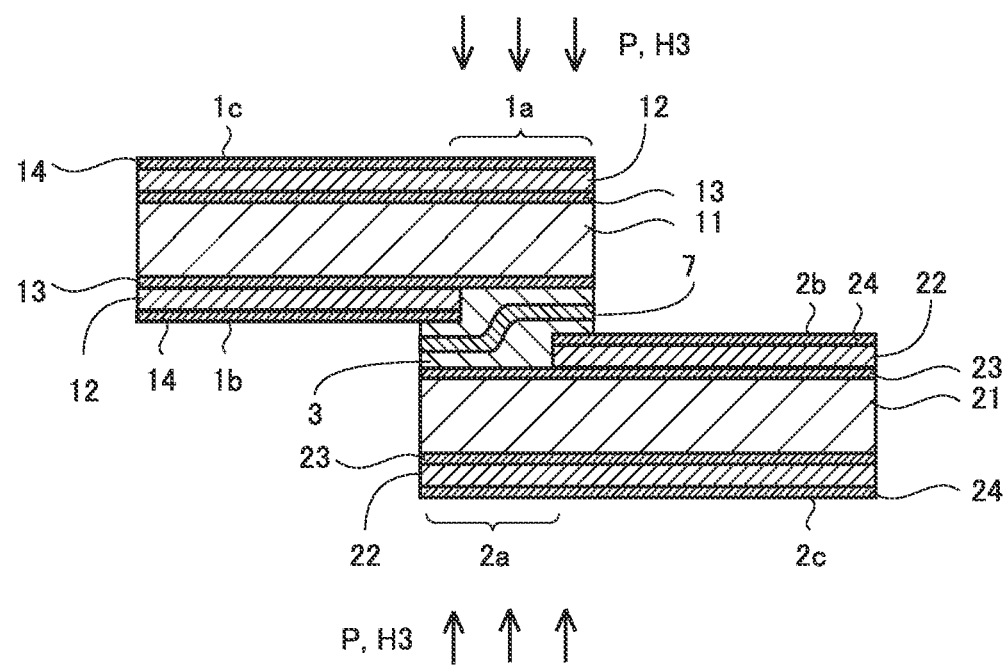
FIG. 23B is a cross sectional view of the superconducting wire in accordance with the third embodiment at the time of joining in the wire rod joining step.

FIG. 23B is a cross sectional view of the superconducting wire in accordance with the third embodiment at the time of joining in wire rod joining step S2. Thereafter, as shown in FIG. 23B, joining of first superconducting wire rod 1 and third reinforcing member 7 and joining of second superconducting wire rod 2 and third reinforcing member 7 are performed. More specifically, heat H3 and pressure P are applied to the portion where first superconducting wire rod 1 and second superconducting wire rod 2 overlap. Thereby, connection member 3 is melted, and joining of first superconducting wire rod 1 and third reinforcing member 7 and joining of second superconducting wire rod 2 and third reinforcing member 7 are performed.

The effect of the superconducting wire in accordance with the third embodiment will be described below.

As described above, the superconducting wire in accordance with the third embodiment has third reinforcing member 7, and third reinforcing member 7 has a strength higher than that of connection member 3, and an electric resistance value lower than that of connection member 3. Therefore, the superconducting wire in accordance with the third embodiment can achieve a lower connection resistance and a higher mechanical strength against bending deformation, tensile deformation, and the like, when compared with the case where first superconducting wire rod 1 and second superconducting wire rod 2 are directly joined by connection member 3.

It should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

1: first superconducting wire rod; 1a: first edge portion; 1b: first front surface; 1c: first back surface; 11: first superconducting layer; 12: first reinforcing layer; 12a: first protruding portion; 13: first internal connection member; 14: first surface connection member; 2: second superconducting wire rod; 2a: second edge portion; 2b: second front surface; 2c: second back surface; 21: second superconducting layer; 22: second reinforcing layer; 22a: second protruding portion; 23: second internal connection member; 24: second surface connection member; 3: connection member; 31: conducting member; 4: first reinforcing member; 5: second reinforcing member; 6: superconducting apparatus; 61: superconducting coil body; 62: heat insulating container; 63: freezer; 64: compressor; 65: power source; 7: third reinforcing member; H1, H2, H3: heat; P: pressure; S1: wire rod processing step; S2: wire rod joining step.

The invention claimed is:

1. A superconducting wire, comprising:
a first superconducting wire rod having a first front surface, and a first back surface which is a surface opposite to the first front surface;
a second superconducting wire rod having a second front surface, and a second back surface which is a surface opposite to the second front surface; and
a connection member joining the first superconducting wire rod to the second superconducting wire rod,
the first superconducting wire rod having a first superconducting layer, and first reinforcing layers provided on a first front surface side and a first back surface side of the first superconducting layer,
the first superconducting wire rod having a first edge portion where the first reinforcing layer on the first front surface side is at least partially removed,
the second superconducting wire rod having a second superconducting layer, and second reinforcing layers provided on a second front surface side and a second back surface side of the second superconducting layer,
the second superconducting wire rod having a second edge portion where the second reinforcing layer on the second front surface side is at least partially removed,
the first front surface located at the first edge portion being joined by the connection member to the second front surface located at other than the second edge portion, and the second front surface located at the second edge portion being joined by the connection member to the first front surface located at other than the first edge portion.

2. The superconducting wire according to claim 1, wherein the first reinforcing layer on the first front surface side is entirely removed at the first edge portion, and the second reinforcing layer on the second front surface side is entirely removed at the second edge portion.

3. The superconducting wire according to claim 1, comprising a conducting member having an electric resistance value lower than that of the connection member, and arranged between the first front surface located at the first edge portion and the second front surface located at the second edge portion.

4. The superconducting wire according to claim 1, further comprising a first reinforcing member which is provided on the first reinforcing layer on the first back surface side, protrudes from the first edge portion, and is joined to the second reinforcing layer on the second front surface side.

5. The superconducting wire according to claim 1, further comprising a second reinforcing member which is provided on the second reinforcing layer on the second back surface side, protrudes from the second edge portion, and is joined to the first reinforcing layer on the first front surface side.

6. The superconducting wire according to claim 1, wherein the superconducting wire has an allowable tensile strength which is more than or equal to 80% of the smaller of allowable tensile strengths of the first superconducting wire rod and the second superconducting wire rod.

7. The superconducting wire according to claim 1, wherein the superconducting wire has an allowable bending diameter which is less than or equal to four times the larger of allowable bending diameters of the first superconducting wire rod and the second superconducting wire rod.

8. A superconducting wire, comprising:
a first superconducting wire rod having a first front surface, and a first back surface which is a surface opposite to the first front surface;
a second superconducting wire rod having a second front surface, and a second back surface which is a surface opposite to the second front surface; and
a connection member joining the first superconducting wire rod to the second superconducting wire rod,
the first superconducting wire rod having a first superconducting layer, and first reinforcing layers provided on a first front surface side and a first back surface side of the first superconducting layer,
the first superconducting wire rod having a first edge portion where the first reinforcing layer on the first front surface side is at least partially removed,
the second superconducting wire rod having a second superconducting layer, and second reinforcing layers provided on a second front surface side and a second back surface side of the second superconducting layer,
the second superconducting wire rod having a second edge portion where the second reinforcing layer on the second front surface side is at least partially removed,
the first front surface located at the first edge portion being joined by the connection member to the second front surface located at other than the second edge portion, and the second front surface located at the second edge portion being joined by the connection member to the first front surface located at other than the first edge portion, the first reinforcing layer on the first back surface side including a first protruding portion which protrudes from the first edge portion and is joined to the second reinforcing layer on the second front surface side, and the second reinforcing layer on the second back surface side including a second protruding portion which protrudes from the second edge portion and is joined to the first reinforcing layer on the first front surface side.

9. The superconducting wire according to claim 8, wherein the first reinforcing layer on the first front surface side is entirely removed at the first edge portion, and the second reinforcing layer on the second front surface side is entirely removed at the second edge portion.

10. A superconducting wire, comprising:
  a first superconducting wire rod having a first front surface, and a first back surface which is a surface opposite to the first front surface;
  a second superconducting wire rod having a second front surface, and a second back surface which is a surface opposite to the second front surface;
  a third reinforcing member arranged between the first front surface and the second front surface; and
  a connection member joining the first superconducting wire rod to the third reinforcing member, and joining the second superconducting wire rod to the third reinforcing member,
  the first superconducting wire rod having a first superconducting layer, and first reinforcing layers provided on a first front surface side and a first back surface side of the first superconducting layer,
  the first superconducting wire rod having a first edge portion where the first reinforcing layer on the first front surface side is at least partially removed,
  the second superconducting wire rod having a second superconducting layer, and second reinforcing layers provided on a second front surface side and a second back surface side of the second superconducting layer,
  the second superconducting wire rod having a second edge portion where the second reinforcing layer on the second front surface side is at least partially removed,
  the first front surface located at the first edge portion being arranged to face the second front surface located at other than the second edge portion,
  the second front surface located at the second edge portion being arranged to face the first front surface located at other than the first edge portion,
  the third reinforcing member having an electric resistance value lower than that of the connection member, and a strength higher than that of the connection member.

11. The superconducting wire according to claim 10, wherein the first reinforcing layer on the first front surface side is entirely removed at the first edge portion, and the second reinforcing layer on the second front surface side is entirely removed at the second edge portion.

12. The superconducting wire according to claim 1, wherein the first reinforcing layers produce compressive strain on the first superconducting layer, and the second reinforcing layers produce compressive strain on the second superconducting layer.

13. The superconducting wire according to claim 12, wherein
  the compressive strain on the first superconducting layer located at the first edge portion is smaller than the compressive strain on the first superconducting layer located at other than the first edge portion, and
  the compressive strain on the second superconducting layer located at the second edge portion is smaller than the compressive strain on the second superconducting layer located at other than the second edge portion.

14. A method for manufacturing a superconducting wire, comprising the step of joining a first superconducting wire rod to a second superconducting wire rod by a connection member, the first superconducting wire rod having a first front surface, and a first back surface which is a surface opposite to the first front surface, the second superconducting wire rod having a second front surface, and a second back surface which is a surface opposite to the second front surface,
  the first superconducting wire rod having a first superconducting layer, and first reinforcing layers provided on a first front surface side and a first back surface side,
  the first superconducting wire rod having a first edge portion where the first reinforcing layer on the first front surface side is at least partially removed,
  the second superconducting wire rod having a second superconducting layer, and second reinforcing layers provided on a second front surface side and a second back surface side,
  the second superconducting wire rod having a second edge portion where the second reinforcing layer on the second front surface side is at least partially removed,
  the first front surface located at the first edge portion being joined by the connection member to the second front surface located at other than the second edge portion, and the second front surface located at the second edge portion being joined by the connection member to the first front surface located at other than the first edge portion.

15. The method for manufacturing the superconducting wire according to claim 14, wherein the first reinforcing layer on the first front surface side located at the first edge portion and the second reinforcing layer on the second front surface side located at the second edge portion are entirely removed.

16. The method for manufacturing the superconducting wire according to claim 14, comprising the step of inserting a conducting member having an electric resistance value lower than that of the connection member, between the first front surface located at the first edge portion and the second front surface located at the second edge portion.

17. A method for manufacturing a superconducting wire, comprising the step of joining a first superconducting wire rod to a second superconducting wire rod, the first superconducting wire rod having a first front surface, and a first back surface which is a surface opposite to the first front surface, the second superconducting wire rod having a second front surface, and a second back surface which is a surface opposite to the second front surface,
  the first superconducting wire rod having a first superconducting layer, and first reinforcing layers provided on a first front surface side and a first back surface side,
  the first superconducting wire rod having a first edge portion where the first reinforcing layer on the first front surface side is at least partially removed,
  the second superconducting wire rod having a second superconducting layer, and second reinforcing layers provided on a second front surface side and a second back surface side,
  the second superconducting wire rod having a second edge portion where the second reinforcing layer on the second front surface side is at least partially removed,
  the first front surface located at the first edge portion being joined to the second front surface located at the second edge portion, the first reinforcing layer on the first back surface side having a first protruding portion protruding from the first edge portion, the second reinforcing layer on the second back surface side having a second protruding portion protruding from the second edge portion, the first protruding portion being joined to the second front surface, and the second protruding portion being joined to the first front surface.

18. The method for manufacturing the superconducting wire according to claim 17, wherein the first reinforcing layer on the first front surface side located at the first edge portion and the second reinforcing layer on the second front surface side located at the second edge portion are entirely removed.

19. A method for manufacturing a superconducting wire, comprising the step of joining a first superconducting wire rod and a second superconducting wire rod to a third reinforcing member by a connection member, the first superconducting wire rod having a first front surface, and a first back surface which is a surface opposite to the first front surface, the second superconducting wire rod having a second front surface, and a second back surface which is a surface opposite to the second front surface, the third reinforcing member being arranged between the first front surface and the second front surface, the first superconducting wire rod having a first superconducting layer, and first reinforcing layers provided on a first front surface side and a first back surface side, the first superconducting wire rod having a first edge portion where the first reinforcing layer on the first front surface side is at least partially removed, the second superconducting wire rod having a second superconducting layer, and second reinforcing layers provided on a second front surface side and a second back surface side, the second superconducting wire rod having a second edge portion where the second reinforcing layer on the second front surface side is at least partially removed, the first front surface located at the first edge portion being arranged to face the second front surface located at other than the second edge portion, and the second front surface located at the second edge portion being arranged to face the first front surface located at other than the first edge portion, the third reinforcing member having an electric resistance value lower than that of the connection member, and a strength higher than that of the connection member.

20. The method for manufacturing the superconducting wire according to claim 19, wherein the first reinforcing layer on the first front surface side located at the first edge portion and the second reinforcing layer on the second front surface side located at the second edge portion are entirely removed.

* * * * *